United States Patent [19]
Pringle et al.

[11] Patent Number: 5,920,831
[45] Date of Patent: Jul. 6, 1999

[54] FILM DIGITIZATION USING DYE DENSITY ESTIMATES

[75] Inventors: Lon N. Pringle; Bruce B. Glasgow, both of Atlanta, Ga.; Thomas P. McElwain, Merrimac, N.H.

[73] Assignee: Georgia Tech Research Corporation, Atlanta, Ga.

[21] Appl. No.: 08/745,666

[22] Filed: Nov. 8, 1996

Related U.S. Application Data

[60] Provisional application No. 60/006,374, Nov. 8, 1995.

[51] Int. Cl.$^6$ ..................................................... H04N 1/04
[52] U.S. Cl. ..................... 702/127; 348/650; 250/559.02
[58] Field of Search ..................................... 364/525, 526; 382/167; 396/563; 348/650, 651; 355/32, 77; 356/402, 404, 405, 406; 358/504, 505, 518, 527; 250/559.02, 559.04, 559.05, 559.06; 702/127

[56] References Cited

U.S. PATENT DOCUMENTS

| | | | |
|---|---|---|---|
| 5,149,960 | 9/1992 | Dunne et al. | 250/226 |
| 5,212,518 | 5/1993 | Numakura et al. | 355/77 |
| 5,273,632 | 12/1993 | Stockkham et al. | 204/180.1 |
| 5,509,086 | 4/1996 | Edgar et al. | 382/167 |

OTHER PUBLICATIONS

Pringle, LN, McElwain, TP, and Glasgow, BB, Digitization of Film for Archiving Through the Estimation of Dye Densities, Proc. of the IS&T/SPIE Symposium on Electronic Imaging: Science & Technology, Color Hard Copy and Graphic Arts IV, vol. 2413 (Feb. 1995).

Pinney, JE and Voglesong, WF, Analytic Densitometry of Reflection Color Print Materials, Photographic Science and Engineering, vol. 6, No. 6, pp. 367–370(Nov.–Dec. 1962).
Viggiano, J. and Wang, C., A Novel Method for Colorimetric Calibration of Color Digitizing Scanners, Proc. TAGA, 143–160 (1993).
Berns, R. and Shyu, M., Colorimetric Characterization of a Desktop Drum Scanner via Image Modeling, IS&T/SID's 2nd Color Imaging Conference: Color Science, Systems and Applications, pp. 41–44 (1994).
Rodriguez, Michael A., and Stockham, Thomas G., Producing Colorimetric Data from Densitometric Scans, SPIE vol. 1913, pp. 413–418 (1993).
Bard, Charleston C., et al., Predicting Long–Term Dark Storage Dye Stability Characteristic of Color Photographic Products from Short–Term Tests, Journal of Applied Photographic Engineering, vol. 6, No. 2, pp. 42–45(1980).

*Primary Examiner*—Thomas Peeso
*Attorney, Agent, or Firm*—Needle & Rosenberg, P.C.

[57] ABSTRACT

The present invention discloses a method for film archival based upon digitization of dye densities of the film. In particular, by using the analytical densities of the dyes and the dye concentrations at each pixel, the present invention provides a method for determining the color of the particular pixel where such color value is not influenced by aging of the film substrate or chemical degradation of the color dyes used. If the analytical densities of a film are known, then the concentration of each dye can be estimated by measuring the logarithm of the transmission of the film in as few as three frequency bands. The error involved in this digitization is a function of filter bandwidth and a function of the number of spectral transmission measurements used for the dye concentration estimation. The present invention is directly applicable in the field of film restoration and corresponding methods and devices for film restoration are disclosed.

25 Claims, 10 Drawing Sheets

SPECTRAL ESTIMATION ERROR AS A FUNCTION OF BANDWIDTH

FILM DIGITIZATION USING DYE DENSITY ESTIMATES

This application claims the benefit, pursuant to 35 U.S.C. § 119, of applicants' provisional U.S. Ser. No. 60/006,374, filed Nov. 8, 1995, the contents of which are hereby incorporated by this reference.

BACKGROUND OF THE INVENTION

1. Field of the Invention

The invention relates to devices and methods for film archival based upon digitization of dye densities of the film. In particular, the devices and methods of the invention use the analytical densities of the dyes and the dye concentrations at each pixel to determine the true color of a particular pixel where such color value is not necessarily influenced by aging of the film substrate or chemical degradation of the color dyes used.

2. Background Art

In prior art systems, the color of a transmissive sample of film or other material is generally expressed as the sum of projection onto each of three primary colors, such that:

$$\text{Arbitrary Color} = R \cdot (\text{Primary 1}) + G \cdot (\text{Primary 2}) + B \cdot (\text{Primary 3}) \quad \text{Equation (1)}$$

where R, G, and B are the projections of the sample's color on the primaries. If the sample is illuminated by a light source with a power spectrum $s(\lambda)$ and has a spectral transmission of $\tau(\lambda)$ where $\lambda$ represents the wavelength of light, then the projection onto each primary is given by:

$$\begin{Bmatrix} R \\ G \\ B \end{Bmatrix} = \int \tau(\lambda) s(\lambda) \begin{Bmatrix} r(\lambda) \\ g(\lambda) \\ b(\lambda) \end{Bmatrix} d\lambda \quad \text{Equation (2)}$$

where $r(\lambda)$, $g(\lambda)$, and $b(\lambda)$ are the projections of the color of a pure spectral line at wavelength $\lambda$ onto the three chosen primaries, and the integral is over all visible wavelengths.

To measure color, it is necessary to construct filters having spectral transmission curves proportional to the functions r, g, and b, so that the RGB values can be deduced by simply measuring the power incident on an optical detector from the source $s(\lambda)$ after passing through the sample and the appropriate filter. If the detectors used do not have perfectly flat spectral response, then they must be divided out of $r(\lambda)$, $g(\lambda)$, and $b(\lambda)$ to achieve the appropriate filter transmissions.

Furthermore, the projections on each primary must necessarily be non-negative when using this type of three-filter color measurement method. Moreover, negative projections can be achieved only by using a fourth filter to supply a subtractive constant. Nonetheless, in prior art systems, measuring all visible colors with three filters requires that the primaries be chosen so that the projections of all visible colors are non-negative. For instance, the CIE standard primaries X, Y, and Z represent such a set and their spectral functions are shown in FIG. 1.

Constructing a set of filters which accurately match these tristimulus functions is expensive and represents a significant shortcoming of heretofore known systems. These typical color measurement systems use three filters which only pass radiation in the wavelength bands ("wavebands") which correspond generally to the humps of the tristimulus curves. Therefore, the transmission curves do not correspond to spectral projection onto actual primaries, but only approximate them.

For these reasons, typical color measurement devices (densitometers and scanners) have inherent errors in their color measurements. These inherent errors lead to at least three major disadvantages of prior systems. First, high accuracy requires that the transmission of the filters accurately correspond to the tristimulus curves (or the projection of spectral colors on some other set of primaries) divided by the responsivity of the detectors. Second, the measurement of color depends upon the light source, $s(\lambda)$. Finally, if restoration of faded colors is to be accomplished, no global transformation to calculate the pre-fading primary projection values from the faded primary projection values exists.

As noted above, the first disadvantage of prior systems is the requirement for high accuracy of accurate filter correspondence to the tristimulus curves divided by detector responsivity. While this disadvantage can be overcome by careful construction of the filters, accurate broadband filters are difficult to manufacture. Furthermore, any variation in responsivity from detector to detector must be accounted for by making customized filters for each detector. Therefore, although in principle this disadvantage can be overcome, in practice the limitation reduces the achievable accuracy for a system where a reasonable cost is necessary.

The second disadvantage, the dependence of the measured color on the light source, is important for reasons of both aesthetics and accuracy. Although most films are manufactured for viewing under a specified light source, the appropriate source to be used for any film is subjective, and source preferences may change with the development of new sources. Unfortunately, in conventional methods, once a light source is chosen for the digitization process, there is no simple, global transformation of the color measured using one light source which corresponds to that measured using another source. Moreover, any measurement process which depends on a light source is limited in accuracy by intensity drifts in the light source.

Finally, in conventional systems, the dependence on the light source can be eliminated by measuring and recording the actual spectral transmission of the film $\tau(\lambda)$, rather than the color. However, the elimination of the source dependence is inefficient for several reasons. Elimination of light source dependence is normally accomplished by measuring the light intensity passed by the film in each spectral band and then dividing out the intensity of the light source in that band. If the source radiation is measured simultaneously (or at least nearly simultaneously) with the radiation passed by the film, this method is highly accurate. The problem with measuring and recording the transmission in this way is that it requires two detections for each spectral band (and thus many detectors or long scan times). Also, recording the transmission requires more information storage than is required for recording color. However, once the transmission is measured and stored, the color of the film can be calculated from equation 2, below, for any assumed light source.

Therefore, it is highly desirable to provide a system of color measurement which accurately models the tristimulus curves. Furthermore, it is highly desirable to provide a system of color measurement which is independent of the light source and which requires little information storage overhead. Finally, it is highly desirable to provide a method of restoring faded colors where a single, global transformation can accomplish the restoration in a very efficient manner.

SUMMARY OF THE INVENTION

The present invention provides methods and devices which encompass a system of color measurement which eliminates the need to model the tristimulus curves. In addition, the present invention provides a system of color measurement that is independent of the light source. Also, the present invention provides devices and methods for restoring faded colors where a single, global transformation accurately accomplishes the restoration.

In particular, the present invention provides a method for digitizing a film frame having one or more dye layers, wherein the film has a known analytical density of each layer and a known minimum density of each layer, comprising the steps of generating analytical density signals corresponding to the known analytical densities of the film and generating minimum density signals corresponding to the known minimum densities of the film, dividing the film frame into one or more pixels, for each pixel, measuring transmittance values in frequency bands associated with each of dye layers and generating transmittance signals corresponding to the measured transmittance values, generating a plurality of dye concentration signals for each pixel from the transmittance signals corresponding to the measured transmittance values, the analytical density signals corresponding to the known analytical densities of the film, and the minimum density signals corresponding to the known minimum densities of the film, and outputting the dye concentration signals for each pixel to a signal processing device.

In a further embodiment, the present invention provides a method for digitizing a film frame having one or more dye layers, wherein the film has an analytical density of each layer and a minimum density of each layer, comprising the steps of, for each dye layer, estimating a candidate linear combination of the selected analytical densities of the film and the minimum densities of the film, generating analytical density signals corresponding to the analytical densities of the film and generating density signals corresponding to the minimum densities of the film, dividing the film frame into one or more pixels, for each pixel, measuring transmittance values in frequency bands associated with each of dye layers and generating transmittance signals corresponding to the measured transmittance values, generating a plurality of dye concentration signals for each pixel from the transmittance signals corresponding to the measured transmittance values, the analytical density signals corresponding to the analytical densities of film, and the minimum density signals corresponding to the minimum densities of the film, and outputting the dye concentration signals for each pixel to a signal processing device.

In a further embodiment, the measuring step comprises irradiating the film with a light source having a selected intensity, and in each of the frequency bands associated with each of dye layers, detecting the radiation transmitted through the film, and in each of the frequency bands associated with each of dye layers, dividing the radiation transmitted through the film by the selected intensity of the light source to determine the measured transmittance value.

In yet a further embodiment, the one or more dye layers of the film frame comprise a cyan dye layer, a magenta dye layer, and a yellow dye layer.

In another embodiment, the present invention provides a method wherein the frequency bands associated with each of dye layers consist of three frequency bands and wherein the step of generating a plurality of dye concentration signals comprises estimating a solution for $d_c$, $d_m$, and $d_y$ in equation I:

$$\begin{bmatrix} -\log[\tau(\lambda_1)] \\ -\log[\tau(\lambda_2)] \\ -\log[\tau(\lambda_3)] \end{bmatrix} = \begin{bmatrix} c(\lambda_1) & m(\lambda_1) & y(\lambda_1) \\ c(\lambda_2) & m(\lambda_2) & y(\lambda_2) \\ c(\lambda_3) & m(\lambda_3) & y(\lambda_3) \end{bmatrix} \begin{bmatrix} d_c \\ d_m \\ d_y \end{bmatrix} + \begin{bmatrix} d_0(\lambda_1) \\ d_0(\lambda_2) \\ d_0(\lambda_3) \end{bmatrix}$$

wherein $d_c$, $d_m$, and $d_y$ are the estimated dye concentration values, $\lambda_1$ through $\lambda_3$ are the three frequency bands, $\tau(\lambda_1)$ through $\tau(\lambda_3)$ are the transmittance values of the film frame in frequency bands $\lambda_1$ through $\lambda_3$, $c(\lambda_1)$ through $c(\lambda_3)$, $m(\lambda_1)$ through $m(\lambda_3)$, and $y(\lambda_1)$ through $y(\lambda_3)$ are, respectively, the dye densities of the film frame in the cyan dye layer, the magenta dye later and the yellow dye layer in frequency bands, $\lambda_1$ through $\lambda_3$, and $d_0(\lambda_1)$ through $d_0(\lambda_3)$ are the minimum absorption density values of the film frame in frequency bands $\lambda_1$ through $\lambda_3$, and generating signals corresponding to the estimated dye concentration values.

In a further embodiment, the present invention provides a method as described herein, wherein each of the frequency bands associated with each of dye layers is a narrow frequency band. In a further embodiment, each of the frequency bands associated with each of dye layers spans less than about 100 nm. In yet another embodiment, each of the frequency bands associated with each of dye layers spans less than about 60 nm. In still a further embodiment, each of the frequency bands associated with each of dye layers spans less than about 40 nm. In yet another embodiment, each of the frequency bands associated with each of dye layers spans about 2 nm.

In another embodiment of the invention, the frequency bands associated with each of dye layers consist of at least four frequency bands and wherein the step of generating a plurality of dye concentration signals comprises determining the plurality of dye concentration signals by least-squares or weighted least squares estimation.

In yet another embodiment, the signal processing device is a means for storing and retrieving one or more signals.

In a further embodiment of the method, signal processing device is a means for storing and retrieving one or more signals and further comprising the steps, in a selected order, of outputting the analytical density signals corresponding to the analytical densities of the film to the means for storing and retrieving one or more signals, outputting the minimum density signals corresponding to the minimum densities of the film to the means for storing and retrieving one or more signals, and outputting the dye concentration signals for each pixel to the means for storing and retrieving one or more signals.

In yet a further embodiment, the estimating step comprises measuring the analytical density z of a full spectral measurement of a selected number of pixels M of the film frame and generating signals corresponding to the measured analytical densities z, and generating signals corresponding to the estimated analytical density and the estimated the minimum density from the spectral measurement of the M pixels by finding the three largest eigenvectors of the N-by-N matrix:

$$\sum_{m=1}^{M} (z_m - \bar{z})(z_m - \bar{z})^T$$

wherein $z_m$ is the measured analytical density of pixel m, and $\bar{z}$ is the average of all $z_m$ measurements.

In an alternate embodiment, the estimating step comprises measuring the analytical density z of a full spectral measurement of a selected number of pixels M of the film frame and generating signals corresponding to the measured analytical densities z, generating signals corresponding to the estimated analytical density and estimated the minimum density in the film from the spectral measurement of the M pixels by minimizing:

$$\frac{1}{NM}\sum_{m=1}^{M}(z_m - \hat{d}_0' - \hat{A}'\hat{c}'_m)^T(z_m - \hat{d}_0' - \hat{A}'\hat{c}'_m)$$

wherein $z_m$ is the measured analytical density of pixel m, N is the number of wavelengths used for the spectral measurement, and A', $d_0'$, and ĉ' are, respectively, the estimates of the estimated analytical densities, the estimated minimum densities and the estimated dye concentration signals.

In yet a further embodiment, the estimating step comprises measuring the analytical density z of a full spectral measurement of a selected number of pixels M of the film frame and generating signals corresponding to the measured analytical densities z, and generating signals corresponding to the estimated analytical density and estimated the minimum density in the film from the spectral measurement of the M pixels by maximizing:

$$pdf = \prod_{m=1}^{M}\frac{1}{(2\pi)^{N/2}|K_m|}\exp\left\{-\frac{1}{2}[(z_m - d_0' - A'c'_m)^T K_m^{-1}(z_m - d_0' - A'c'_m)]\right\}$$

wherein $z_m$ is the measured analytical density of pixel m, N is the number of wavelengths used for the spectral measurement, $K_m$ is the N-by-N measurement noise covariance matrix for pixel m, and A', $d_0'$, and ĉ' are, respectively, the estimates of the estimated analytical densities, the estimated minimum densities and the estimated dye concentration signals.

In yet another embodiment, the estimating step comprises measuring the analytical density z of a full spectral measurement of a selected number of pixels M of the film frame and generating signals corresponding to the measured analytical density, and generating a signal corresponding to the estimated analytical densities and estimated the minimum densities in the film from the spectral measurement of the M pixels by minimizing:

$$\chi^2 \equiv \sum_{m=1}^{M}(z_m - d_0' - A'c'_m)^T K_m^{-1}(z_m - d_0' - A'c'_m)$$

wherein $z_m$ is the measured analytical density of pixel m, $K_m$ is the N-by-N measurement noise covariance matrix for pixel m, and A', $d_0'$, and ĉ' are, respectively, the estimates of the estimated analytical densities, the estimated minimum densities and the estimated dye concentration signals.

In addition, the present invention provides a method of restoring a faded film frame comprised of one or more pixels each having an associated plurality of dye concentration values, comprising, for each of the pixels, multiplying the plurality of dye concentration values by a selected restoration value and generating from the product a plurality of restored dye concentration signals, and outputting the plurality of restored dye concentration signals to a signal processing device.

In another embodiment, the present invention provides the described methods wherein the signal processing device is a means for, for each of the pixels in the film frame, generating a signal corresponding to a projected pixel color from the plurality of dye concentration signals, the method further comprising the step of outputting the projected pixel color signals to a second signal processing device.

In yet another embodiment, the present invention provides a method of projecting a restored film frame comprised of one or more pixels each having an associated plurality of dye concentration values, comprising, for each of the pixels, generating a signal corresponding to a projected pixel color from the plurality of restored dye concentration values, and outputting the projected pixel color signals to a signal processing device.

In another embodiment, the present invention provides a scanner for digitizing a film frame having one or more dye layers, wherein the film has a known analytical density of each layer and a known minimum density of each layer, comprising, means for generating analytical density signals corresponding to the known analytical densities of the film, means for generating minimum density signals corresponding to the known minimum densities of the film, means for dividing the film frame into one or more pixels, means for measuring transmittance values in frequency bands associated with each of dye layers for each pixel and for generating transmittance signals corresponding to the measured transmittance values, means for generating a plurality of dye concentration signals for each pixel from the transmittance signals corresponding to the measured transmittance values, the analytical density signals corresponding to the known analytical densities of the film, and the minimum density signals corresponding to the known minimum densities of the film, and a means for outputting the dye concentration signals for each pixel to a signal processing device.

In a further embodiment, the signal processing device is a means for storing and retrieving one or more signals. In yet a further embodiment, the signal processing device is a means for projecting one or more signals.

In another embodiment, the present invention provides a method for digitizing a film frame having one or more dye layers, wherein the film has a known analytical density of each layer and a known minimum density of each layer, comprising the steps of dividing the film frame into one or more pixels, and for each pixel, measuring transmittance values in frequency bands associated with each of dye layers, computing a plurality of dye concentration values for each pixel from the measured transmittance values, the known analytical densities of the film, and the known minimum densities of the film, and outputting the dye concentration values for each pixel to a signal processing device.

In another embodiment, the present invention provides a method for digitizing a film frame having one or more dye layers, wherein the film has an analytical density of each layer and a minimum density of each layer, comprising the steps of, for each dye layer, estimating the analytical density and the minimum density, dividing the film frame into one or more pixels, for each pixel, measuring transmittance values in frequency bands associated with each of dye layers, computing a plurality of dye concentration values for each pixel from the measured transmittance values, the estimated analytical densities of the film, and the estimated minimum densities of the film, and outputting the dye concentration values for each pixel to a signal processing device.

In another embodiment, the present invention provides a method for digitizing a reflective print frame having one or more dye layers, wherein the print frame has a known analytical density of each layer and a known minimum density of each layer, comprising the steps of generating analytical density signals corresponding to the known analytical densities of the print frame and generating minimum density signals corresponding to the known minimum densities of the print frame, dividing the print frame into one or more pixels, for each pixel, measuring transmittance values in frequency bands associated with each of dye layers and generating transmittance signals corresponding to the measured transmittance values, generating a plurality of dye concentration signals for each pixel from the transmittance signals corresponding to the measured transmittance values, the analytical density signals corresponding to the known analytical densities of the print frame, and the minimum density signals corresponding to the known minimum densities of the print frame, and outputting the dye concentration signals for each pixel to a signal processing device.

In a further embodiment, the invention provides a method for digitizing a reflective print frame having one or more dye layers, wherein the print frame has an analytical density of each layer and a minimum density of each layer, comprising the steps of, for each dye layer, estimating a candidate linear combination of the selected analytical densities of the print frame and the minimum densities of the print frame, generating analytical density signals corresponding to the analytical densities of the print frame and generating density signals corresponding to the minimum densities of the print frame, dividing the print frame into one or more pixels, for each pixel, measuring transmittance values in frequency bands associated with each of dye layers and generating transmittance signals corresponding to the measured transmittance values, generating a plurality of dye concentration signals for each pixel from the transmittance signals corresponding to the measured transmittance values, the analytical density signals corresponding to the analytical densities of print frame, and the minimum density signals corresponding to the minimum densities of the print frame, and outputting the dye concentration signals for each pixel to a signal processing device.

In yet another embodiment, the measuring step comprises irradiating the print frame with a light source having a selected intensity, and, in each of the frequency bands associated with each of dye layers, detecting the radiation reflected from the print frame, and, in each of the frequency bands associated with each of dye layers, dividing the radiation reflected from the print frame by the selected intensity of the light source to determine the measured reflectance values, and computing transmittance values from each of the reflectance values.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION OF THE PREFERRED EMBODIMENTS

Figure 1:
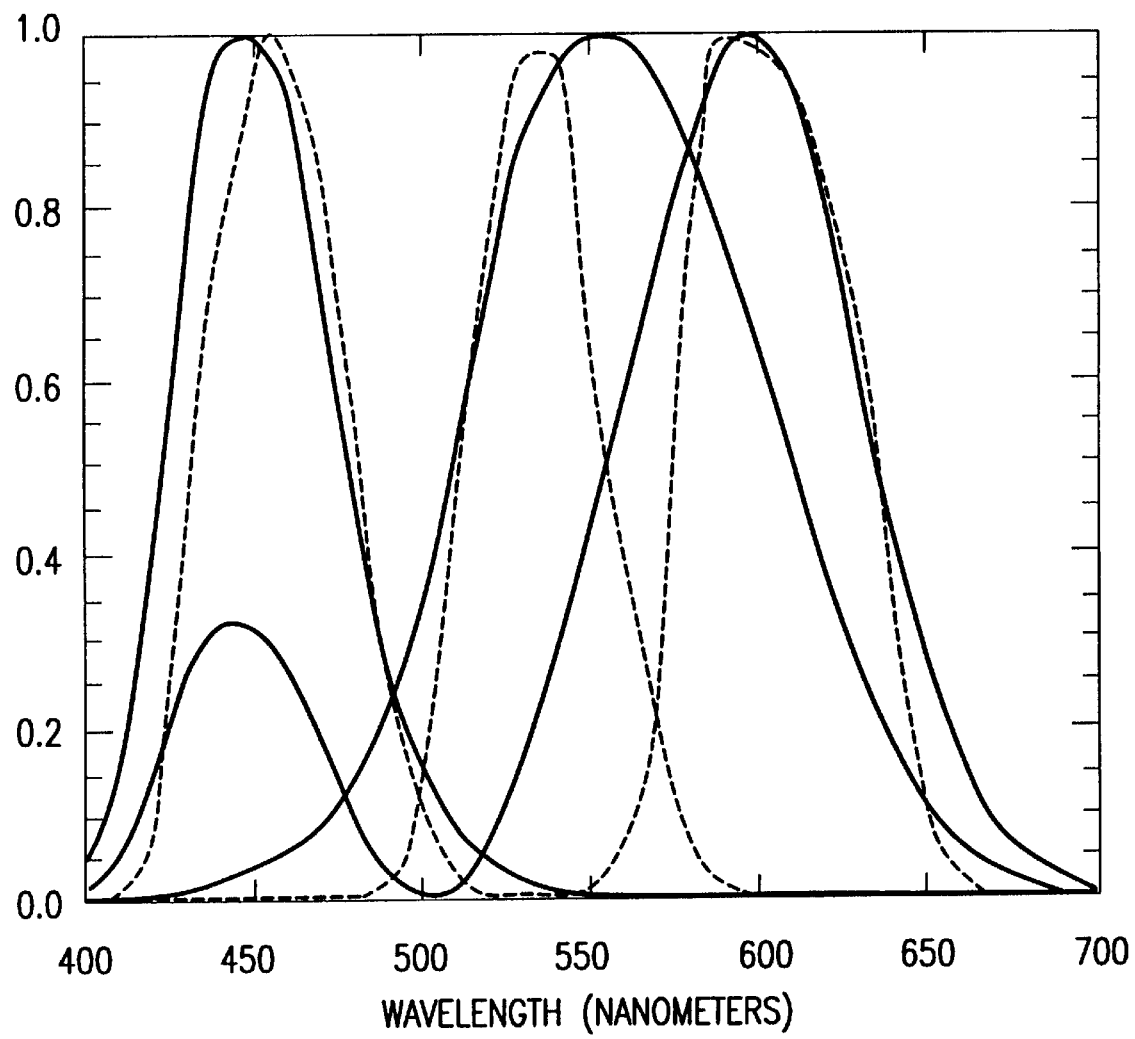
FIG. 1 shows tristimulus curves (solid lines) and three filter shapes similar to those that would be found in a scanner (dashed lines).

The present invention may be understood more readily by reference to the following detailed description of preferred embodiments of the invention and to the Figures.

Before the present devices and methods are disclosed and described, it is to be understood that the terminology used herein is for the purpose of describing particular embodiments only and is not intended to be limiting. It must be noted that, as used in the specification and the appended claims, the singular forms "a," "an" and "the" include plural referents unless the context clearly dictates otherwise.

Throughout this application, various publications are referenced. The disclosures of these publications in their entireties are hereby incorporated by reference into this application in order to more fully describe the state of the art to which this invention pertains.

I. Overview

The present invention provides a methods and devices which encompass a system of color measurement which accurately models the tristimulus curves. The present invention discloses a system of color measurement that is independent of the light source. Furthermore, the present invention discloses devices and methods for restoring faded colors where a single, global transformation accurately accomplishes the restoration.

More particularly, the present invention discloses a method for film archival based upon digitization of dye densities and concentrations of the film. In particular, by using the analytical densities of the dyes and the dye concentrations at each pixel, the present invention provides a method for determining the color of the particular pixel where such color value is not influenced by aging of the film substrate or chemical degradation of the color dyes used.

If the analytical densities of a film are known, then the concentration of each dye in each pixel can be estimated by measuring the logarithm of the transmission of the film at that pixel location in as few as three frequency bands. The error involved in this digitization is a function of filter bandwidth and a function of the number of spectral transmission measurements used for the dye concentration estimation. The present invention is directly applicable in the field of film restoration and discloses corresponding devices and methods for restoring film.

Measurement of color as disclosed herein is useful for many purposes, including the recording of a digital master of a film or slide for permanent storage and from which copies could be made in any desired format (HDTV, NTSC, etc.) through software manipulation.

II. Systems of the Invention

The following description of the methods and systems of the present invention demonstrates their application to photographic transparencies (photographic slides). For photographic prints, the same methods and systems can be used, but require the extra step of transforming the measured reflection measurements to equivalent transmissions measurements (as described infra), for which Beer's Law is applicable. However, it should be emphasized that the application to photographic film is by way of example only and is not to be considered a limitation upon the invention. The procedure of the invention is useful for any color matching scheme, including but not limited to, computer monitors, color laser printers, color ink dot printers, dye sublimation printers, and 4-color separation printing. Color photographic film has been chosen as a matter of convenience only.

When the present system is applied to the limited case of transmissive photographic film, a simple storage and retrieval method for highly accurate reproduction of the film results. In the present system, the concentration of the three photographic dyes present in each spatial pixel of the film is recorded and measured. From these concentrations, $\tau(\lambda)$ can be calculated given the spectral transmission of each dye and of the film substrate. This calculation is possible because the transmission density of color film accurately obeys Beer's Law:

$$\tau(\lambda) = 10^{-[d_0(\lambda) + d_c \cdot c(\lambda) + d_m \cdot m(\lambda) + d_y \cdot y(\lambda)]} \qquad \text{Equation (3)}$$

where $d_0(\lambda)$ is the minimum absorption density of the film. The film has a minimum absorption density due to the substrate and a minimum amount of dye present after development, even in unexposed film. In the above equation 3, $c(\lambda)$, $m(\lambda)$, and $y(\lambda)$ represent the spectral absorption densities of the cyan, magenta, and yellow dyes, respectively (called "dye density curves" by film manufacturers), and the numbers $d_c$, $d_m$, and $d_y$ represent the concentrations of each dye.

Because the dye density curves and $d_0(\lambda)$ are published by the film's manufacturer, the spectral transmission of a known type of film can be characterized by only three numbers ($d_c$, $d_m$, and $d_y$) for each spatial pixel, which is the same number of values used in the standard color measuring systems. Because the same amount of information per pixel is stored, the present system requires no increase in overhead per pixel to achieve the highly desirable benefits of accurate color reproduction and restoration.

When reconstruction of an image is desired, the true spectral transmission can be calculated in software by using equation 3, and the color under any assumed light source can then be calculated using equation 2, expanded upon any convenient set of primaries. With this information the optimum color characterization for any specified output device can be achieved.

In the present invention, measurement of the dye concentrations for each pixel is carried out as follows. First, the radiation transmitted through or reflected from the film is detected in three or more narrow wavebands. Second, the detected radiation in those wavebands is divided by the source intensity in those wavebands. This division provides the transmissions in each waveband ($\tau(\lambda_n)$ for the nth waveband). For reflection prints, the actual reflection measurement must be transformed to an equivalent transmission measurement, which is the transmission of the dye lasers in the print. The transformation can be achieved with a mathematical mode (e.g., as in Equation 7) or a look-up table which approximates the mathematical model. Finally, the unknown values of $d_c$, $d_m$, and $d_y$ are calculated. If three wavebands are used, this calculation is achieved by using equation 4:

$$\begin{bmatrix} -\log[\tau(\lambda_1)] \\ -\log[\tau(\lambda_2)] \\ -\log[\tau(\lambda_3)] \end{bmatrix} = \begin{bmatrix} c(\lambda_1) & m(\lambda_1) & y(\lambda_1) \\ c(\lambda_2) & m(\lambda_2) & y(\lambda_2) \\ c(\lambda_3) & m(\lambda_3) & y(\lambda_3) \end{bmatrix} \begin{bmatrix} d_c \\ d_m \\ d_y \end{bmatrix} + \begin{bmatrix} d_0(\lambda_1) \\ d_0(\lambda_2) \\ d_0(\lambda_3) \end{bmatrix} \qquad \text{Equation (4)}$$

For greater accuracy, more than three wavebands can be used. In the case where more than three wavebands are used, an estimation method is used to solve for the dye concentrations. Two examples of estimation methods are illustrated herein, in conjunction with Equations 14 and 15.

Ideally, the filters used to isolate $\lambda_1$, $\lambda_2$, and $\lambda_3$ are narrow-band. In that case, the detector's spectral response curve accounts for little or no decrease in measurement accuracy. Only the response of the detector (or detectors) in each of the three bands is required, and this can be periodically checked during the operation of such a scanner.

Measurement of the film's dye concentrations is, therefore, free from the first two disadvantages of standard color measurement listed above. In addition, the method of the present invention allows for a global linear transformation of the stored values which could be used to restore faded film colors.

Fading of films is generally caused by oxidation reduction of some dyes which causes the corresponding dye clouds to become transparent over time. A simple multiplicative global increase of the dye concentration values for the faded dye clouds restores the colors. This assumes that the original dye concentrations are known.

Of course, knowledge of the original dye concentrations might not be known. Even if the original or true dye concentrations are not known, the method of the present invention guarantees the existence of a correct global transformation to reverse this fading, and that if any local piece of the film is corrected properly, then the entire film can be corrected with the same global transformation, assuming the fading is spatially uniform for the entire film.

The present invention requires overcoming two technical difficulties encountered in digitizing film via recording of dye concentrations. First, detection of the transmitted light through narrow-band filters requires longer integration times to achieve the same signal-to-noise ratio as present systems which use wider filter bandwidths. Second, the spectral characteristics of the film dyes must be known, which may not be the case for old or rare films.

Throughout this application, experimental spectral measurements are used to illustrate and verify the utility and operation of the present invention. These measurements are meant for purposes of example only and are not intended to constitute limitations upon the scope of the invention. For the purposes of the present disclosure, the subject of the measurements is a set of 32 colored slides. One of skill in the art would recognize that fewer or more samples could be used to verify the operation of the presently described method and devices. The slides represented pictures of colored sheets of construction paper. The photographs were taken extremely out of focus in order to blur to homogeneity any structure in the paper. The film used was Kodak ECK-TACHROME® and the film was developed by conventional developing procedures.

Spectral transmission measurements of all 32 colors were taken in the visible spectrum at wavelengths from 380 to 750 nm at a 5 nm spacing using a Perkin-Elmer λ-19 photospectrometer (Perkin-Elmer λ-19, Norwalk, Conn.). In addition, the spectral transmission of a subset of these slides consisting of 23 colors were also measured using a Milton-Roy 1201 photospectrometer (Milton-Roy 1201, Rochester, N.Y.) every 5 nm in the visible spectrum at wavelengths from 400 to 700 nm. Although the Perkin-Elmer data set is more complete, the Milton-Roy data is used for the present analysis because the source spectrum is independently measured and recorded for that instrument (the Perkin-Elmer is a dual-beam instrument, and thus the source is automatically divided out, requiring no reference measurement of the source).

The down-select to 23 colors for the Milton-Roy data was a result of experimental convenience and was made randomly before any measurements were taken. Table 1 lists the tristimulus values for the 32 colors used. The first 23 of these were measured with both instruments.

TABLE 1

Tristimulus Values of Colors

| # | X | Y | Z | # | X | Y | Z | # | X | Y | Z |
|---|---|---|---|---|---|---|---|---|---|---|---|
| 1 | 73 | 74 | 64 | 12 | 22 | 16 | 16 | 23 | 72 | 63 | 73 |
| 2 | 73 | 74 | 65 | 13 | 3.0 | 2.7 | 8.1 | 24 | 5.7 | 6.5 | 8.0 |
| 3 | 12 | 8.4 | 12 | 14 | 5.1 | 5.4 | 4.5 | 25 | 16 | 17 | 16 |
| 4 | .97 | .89 | .95 | 15 | 2.8 | 3.0 | 3.9 | 26 | 4.9 | 4.6 | 5.5 |
| 5 | 4.4 | 2.7 | 3.2 | 16 | 13 | 7.9 | 1.2 | 27 | 4.4 | 6.5 | 3.5 |
| 6 | 5.2 | 2.9 | 5.2 | 17 | 7.7 | 4.7 | .88 | 28 | 4.5 | 6.5 | 3.5 |
| 7 | 7.0 | 6.0 | 3.5 | 18 | 11 | 9.0 | 3.4 | 29 | 4.1 | 2.1 | .66 |
| 8 | 4.8 | 3.3 | 7.2 | 19 | 24 | 24 | 17 | 30 | 3.3 | 1.6 | .24 |
| 9 | 5.3 | 4.1 | 4.4 | 20 | 6.4 | 8.6 | 3.5 | 31 | 18 | 17 | 1.4 |
| 10 | 5.5 | 4.8 | 12 | 21 | 5.2 | 4.8 | .35 | 32 | .035 | .035 | .022 |
| 11 | 10 | 5.9 | 7.2 | 22 | 1.3 | 1.4 | 1.9 | | | | |

IV: Estimation of the Dye Density Curves

The dye density curves and the minimum density curve are normally available from the film manufacturer. However, if the user wishes to digitize film of an unknown type, these curves must be measured. This section demonstrates that these curves (up to an arbitrary linear combination of the dye density curves) can be estimated by making a full spectral measurement of a selected number of pixels of the film. These estimated curves can then be used to provide the necessary matrix elements of equation 4 to specify a solution for the dye concentrations for each pixel, and these curves must be used to reconstruct the spectral transmission of each pixel based on the stored values (equation 3).

The estimation process involves using Beer's Law to express the log of the transmission measurement in vector notation:

$$z = -\log\tau + n = A \cdot c + d_0 + n \qquad \text{Equation (5)}$$

where log τ, c, and $d_0$ respectively represent the log-of-transmission column matrix, the dye concentration column matrix and the minimum density column matrix. The column matrix n represents the noise in the spectral measurement. The rows of these matrices correspond to any specified set of N wavelengths. Thus, for the case where N=3 and assuming no noise, equation 4 and equation 5 are identical. In the equation, A is an N-by-3 matrix whose elements represent the values of the three dye density curves for each of the N specified wavelengths. The variable z is called the measured transmission analytical density of the sample. If the N wavelengths $\lambda_1, \lambda_2, \ldots, \lambda_N$ represent a set of wavelengths which adequately cover the visible spectrum, measuring the dye density curves is equivalent to finding the elements of A. Similarly, measuring the minimum density curve is equivalent to finding the elements of $d_0$.

By making spectral measurements of a subset of pixels, the values of A and $d_0$ can be estimated only to within an arbitrary linear combination of the dye density curves. This ambiguity arises because equation 5 can be written in an equivalent manner as $$z = (AU)[U^{-1}(c - c_0)] + (d_0 + A \cdot c_0) + n, \qquad \text{Equation (6)}$$
$$= A' \cdot c' + d_0' + n$$

where U is any 3-by-3 non-singular matrix and $c_0$ is any arbitrary 3-dimensional column matrix. Because A, c, and $d_0$ are all unknowns, there is no way to favor retrieval of the true dye density curves and true minimum density curve over the equally valid solutions represented by A' and $d_0'$. In fact, the analytical density of any single color or sum of colors of the film samples is a valid solution for $d_0'$.

Although these ambiguities prevent one from estimating the true film characteristics, specification of the transmittance of any pixel using A', $d_0'$, and c' is completely equivalent to the transmittance specification using A, $d_0$, and c. The only requirement for using a particular A' and $d_0'$ is that the A' and $d_0'$ used in the digitization process must be recorded onto the digital master at least once (for each film). The digitally recorded values of c' for each pixel are meaningful only when referenced to the particular A' and $d_0'$ used.

Although the present invention discloses two preferred methods for estimating dye density, one of skill in the art would recognize that other, equally valid methods of estimation might be used. Such methods are intended to be within the scope of the present disclosure. The first method for estimating the dye density and minimum density curves is to assume that the dye density curves are the three eigenvectors of the N-by-N matrix $$\sum_{m=1}^{M}(z_m - \bar{z})(z_m - \bar{z})^T \qquad \text{Equation (7)}$$

that have the largest eigenvalues. These are the first three basis vectors of the Karhunen and Loeve, or K-L, transform. Jain, Anil K., *Fundamentals of Digital Image Processing*, Prentice Hall. In the equation, $\bar{z}$ is the average of all $z_m$ measurements, and $(\ )^T$ represents taking the transpose of a matrix. This method is equivalent to minimizing the squared error $$\frac{1}{NM}\sum_{m=1}^{M}\left(z_m - \hat{d}_0' - \hat{A}'\hat{c}'_m\right)^T\left(z_m - \hat{d}_0' - \hat{A}'\hat{c}'_m\right) \qquad \text{Equation (8)}$$

where A', $d_0'$, and ĉ' are the estimates of A', $d_0'$, and c'.

A second preferable method of estimating dye density is the maximum likelihood approach (i.e., a Bayesian estimation which assumes no prior knowledge of the unknowns). This method would be optimal for a linear estimation problem. However, the present problem is nonlinear because the measurement is the product of two unknowns (A and c). Nonetheless, for the purposes of the present invention, the Bayesian estimation provides reliable estimates.

If the noise in the measurements is Gaussian (as is generally the case with standard detectors), then A' is estimated (as are the associated c's and $d_0$'s) by finding the A', c's and $d_0$' which maximize the probability distribution function:

$$pdf = \prod_{m=1}^{M} \frac{1}{(2\pi)^{N/2}|K_m|} \exp\left\{-\frac{1}{2}[(z_m - d_0' - A'c'_m)^T K_m^{-1}(z_m - d_0' - A'c'_m)]\right\}$$

Equation (9)

where K is the N-by-N measurement noise covariance matrix. This is the equivalent to finding the minimum of $$\chi^2 \equiv \sum_{m=1}^{M}(z_m - d_0' - A'c'_m)^T K_m^{-1}(z_m - d_0' - A'c'_m)$$

Equation (10)

When noise is associated with radiation detection, the Gaussian assumption is usually valid. To verify, the measurement of $-\log(\tau)$ for a particular sample at a narrow waveband is chosen. If the source of the radiation is R and the radiation transmitted by the sample is S, then $$z = -\log\left(\frac{S + n_S}{R + n_R}\right) \approx -\left[\log(\tau) + \frac{n_S}{R\tau} - \frac{n_R}{R}\right]$$

Equation (11)

where both the source measurement noise $n_R$ and the sample measurement noise $n_S$ are detection noises, which are Gaussian. The approximation holds for values of S less than about 3 times the standard deviation of $n_S$.

In general, the standard deviation of $n_S \propto \sqrt{\eta\tau R}$, where $\eta$ is the detector quantum efficiency, and the standard deviation of $n_R \propto \sqrt{\tau R}$. When measuring the analytical density of a particular sample m in a particular band i, the variance of the noise of $z_m$ is given by $(K_m)_{i,i}$, where $$(K_m)_{i,j} = C\sqrt{\frac{\eta_i}{R_i}\left(\frac{1}{(\tau_m)_i} + 1\right)} \delta_{i,j}$$

Equation (12)

C is a constant which depends on the physical size, mount geometry and material properties of the detector, and i and j are indices corresponding to the N wavelengths. Because this noise increases with decreasing transmittance of the sample, the maximum likelihood estimation approach will weight the validity of high transmittance (low density) samples over those of low transmittance (high density).

Setting the partial derivatives of $\chi^2$ equal to zero eliminates the variables $d_0'$ and $c_m'$, so that $\chi^2$ is a function of A' only:

$$\chi^2 \text{ (at its max)} = \sum_{m=1}^{M}(z_m - z)^T\left[\overline{K_m}^{-1} - H_m\right](z_m - z)$$

Equation (13)

where $H_m \equiv \overline{K_m}^{-1} A'\left\{A'^T \overline{K_m}^{-1} A'\right\}^{-1} A'^T \overline{K_m}^{-1}$, $$\overline{K_m} \equiv C\sqrt{\frac{\eta_i}{R_i}\left(\frac{1}{10^{-(z_m)_i}} + 1\right)} \delta_{i,j} \quad \text{and}$$

$$z \equiv \left(\sum_{m=1}^{M}\left[\overline{K_m}^{-1} - H_m\right]\right)^{-1} \sum_{m=1}^{M}(\overline{K_m}^{-1} - H_m)z_m$$

This is a weighted, least squares solution such that the average z is calculated with a weighted average which emphasizes the low density samples. Similarly, the concentrations are calculated with weighted-pseudo-inverse operation. If K is proportional to the identity matrix, the solution is identical to that offered by the K-L transform method (to within the arbitrary linear combination).

The minimization strategy used in the present invention was to search for the elements of A' which minimize $\chi^2$ as written in equation 13. Several search routines can be used, including amoeba, conjugate-gradient algorithm and constrained-minimization routine (IMSL utilities) with the elements of A' constrained to be always greater than zero. See Press, William H., et al., *Numerical Recipes*, Cambridge University Press (1986). There are actually an infinite number of minima, each representing a different linear combination of the true dye density curves. In practice, however, initiating the search with an initial guess of three rectangle functions centered in the red, green, and blue regions of the visible spectrum, allows each of the minimization routines to converge quickly to one of the minima which is local to the initial guess.

Figure 2A:
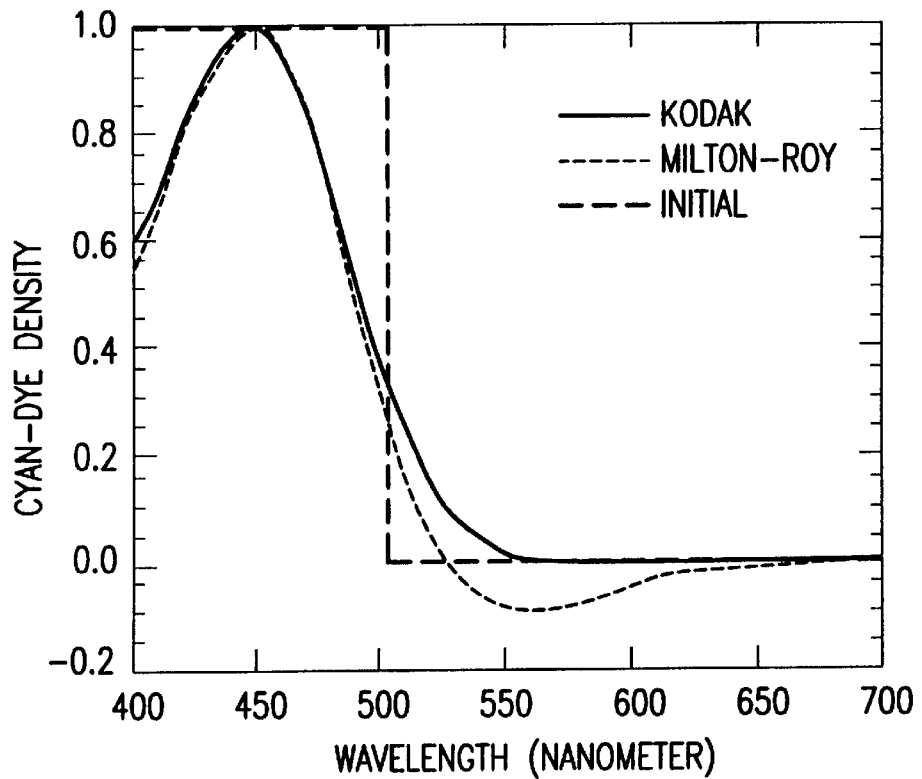
FIG. 2 shows the initial guesses for the dye density curves, the dye density estimates and the true dye density curves supplied by the manufacturer.
Figure 2B:
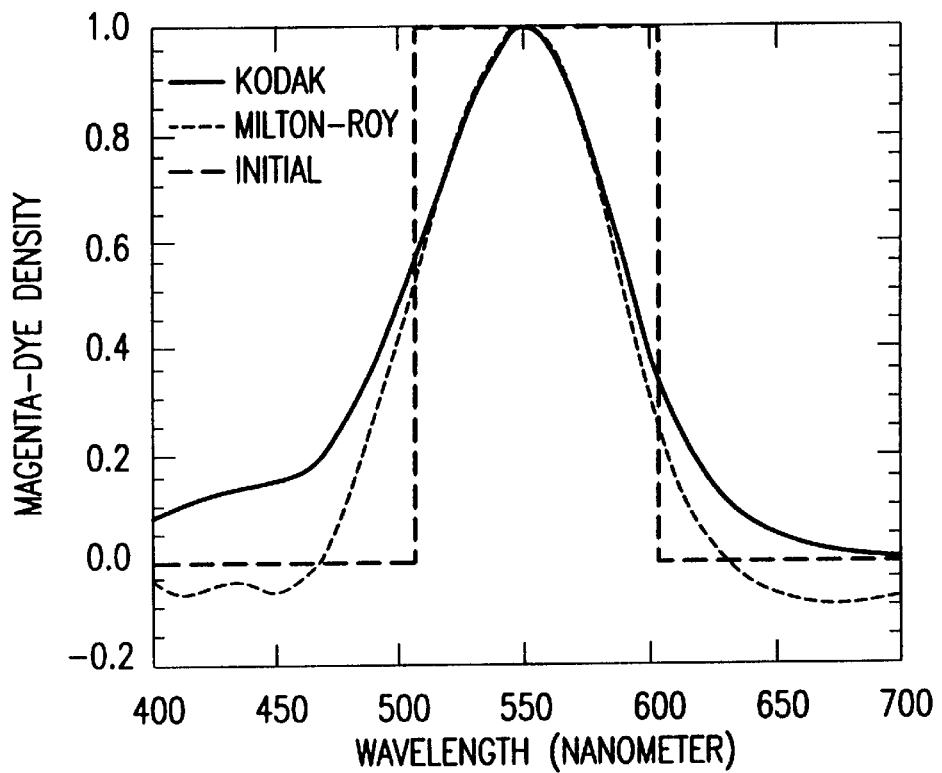
Figure 2C:
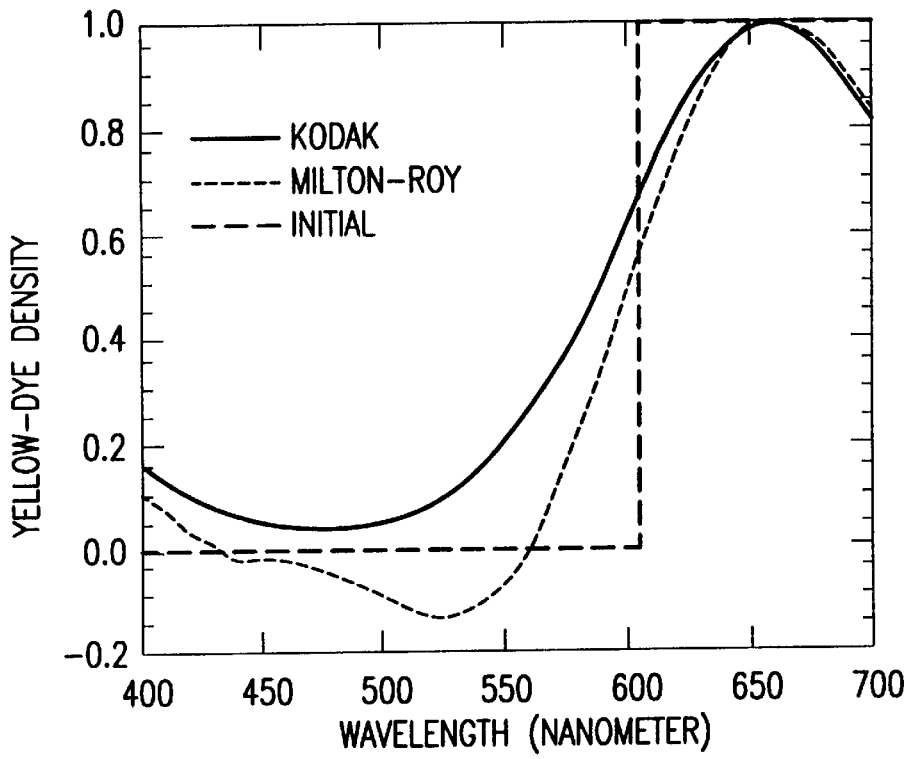

FIG. 2 displays the initial guesses, the estimated values for the dye density curves (elements of A') using all 23 colors in the Milton-Roy data set, and the true dye density curves as supplied by the manufacturer, Kodak (elements of A). Due to the choice of the initial guess, the humps of the estimates match well with the humps of the true dye density curves. As discussed below, this is preferable to the use of a K-L transform method where the dye density curves are chosen to maximize $|c_m'|^2$ summed over.

Figure 3A:
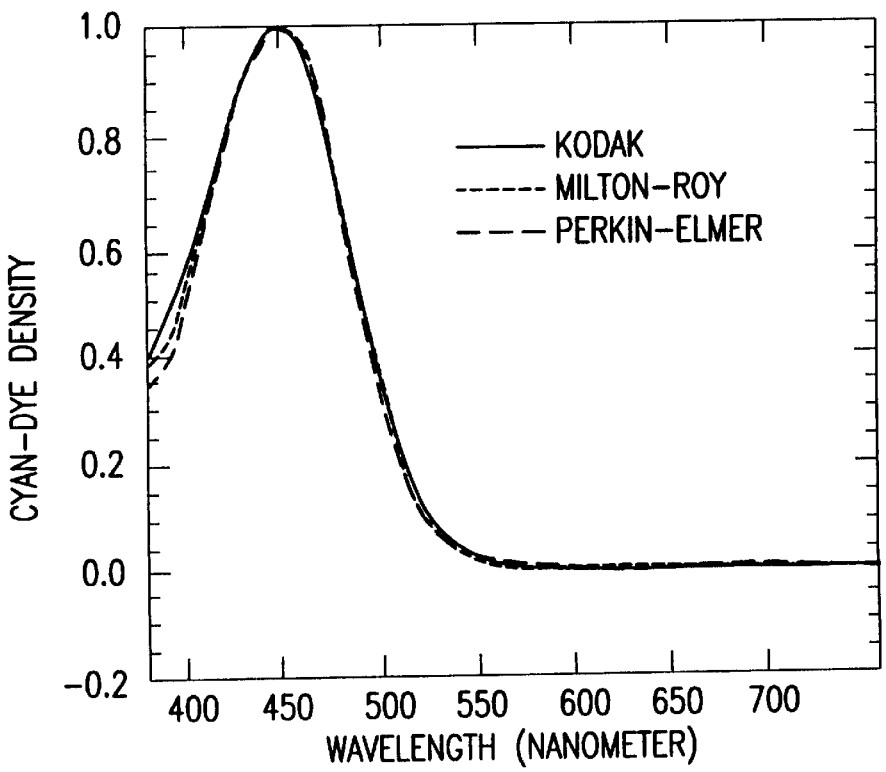
FIG. 3 shows the true dye density curves from the manufacturer versus the dye density curves estimated from the Milton-Roy and Perkin-Elmer data sets.
Figure 3B:
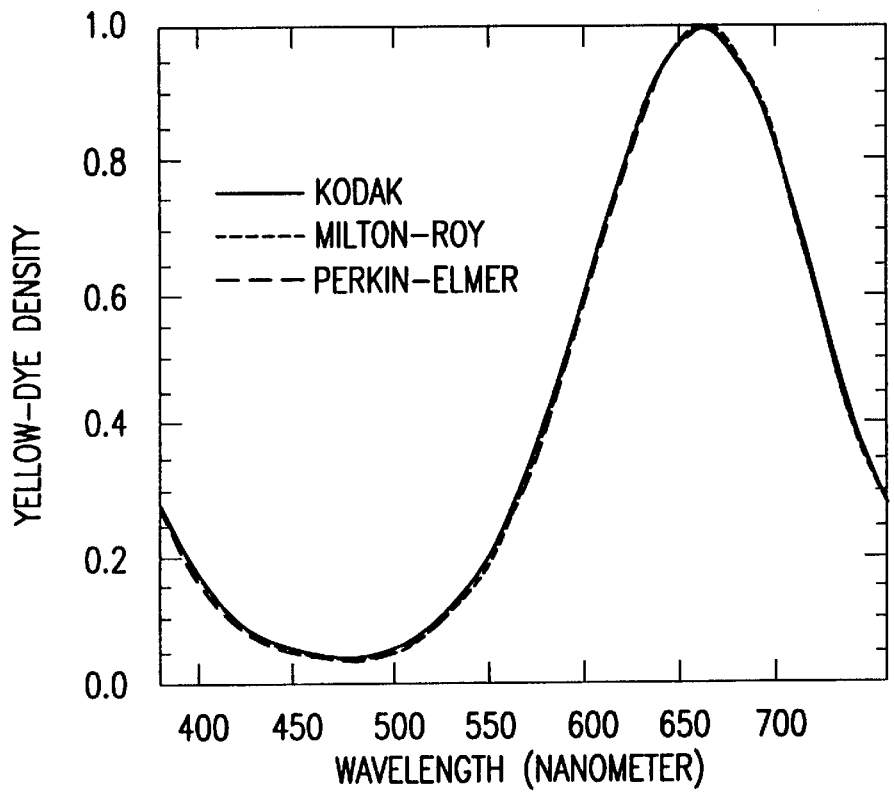
Figure 3C:
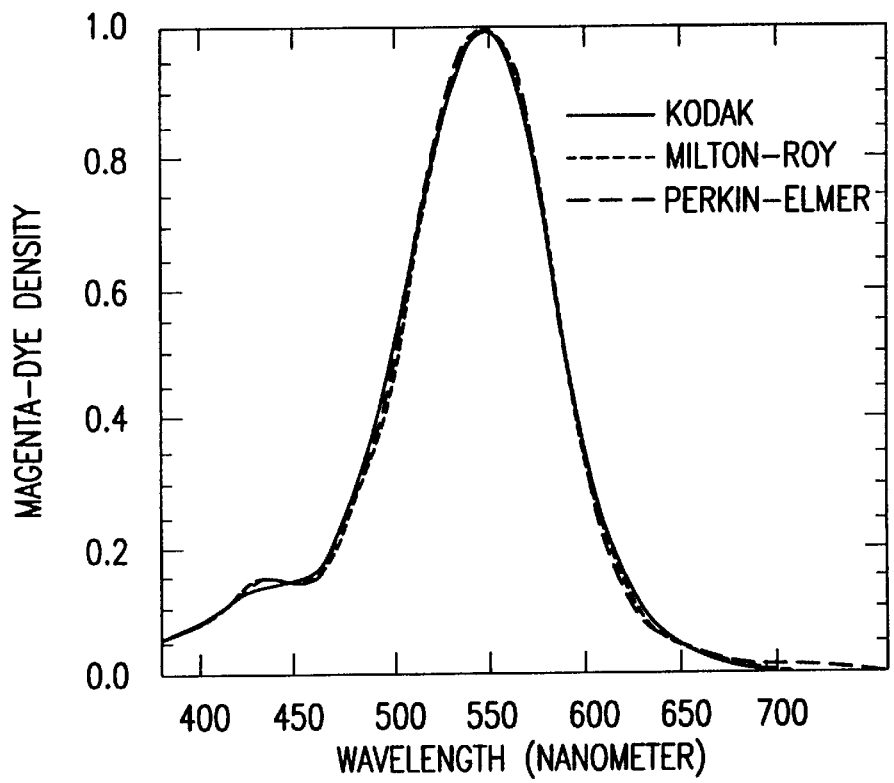

Accuracy can be tested by comparing the manufacturer supplied dye density curves to the linear combination of the dye density estimates which best matches the manufacturer's, such as Kodak's, curves. For the purposes of the present disclosure, the curves were hand-digitized at a resolution of 10 nm. One of skill in the art would recognize that the manufacturer's curves could be represented in any convenient analytical manner. FIG. 3 shows excellent agreement for both the Perkin-Elmer data and the Milton-Roy data over the respective wavelength bands.

Due to the low noise of the Milton-Roy measurements, the K-L transform method provided nearly identical results. The noise in these measurements is sufficiently low so that one can take nearly any four colors from this data set at random, declare the analytical density of one of these colors as $d_0'$ and declare the other three (after subtracting $d_0'$) as dye density curve estimates.

Once an estimation method is chosen, the necessary bandwidth of the spectral measurements for the purpose of dye density estimation is considered. The above estimates were derived from narrow band (2 nm) measurements. Because the Milton-Roy spectrophotometer measures the source spectrum and because the source spectrum and sample spectra are relatively smooth, measurements of larger bandwidths can be simulated by multiplying the measured transmittance by the source at each wavelength, adding the results and dividing this sum by the sum of the source signal from the same spectral neighbors.

Figure 4:
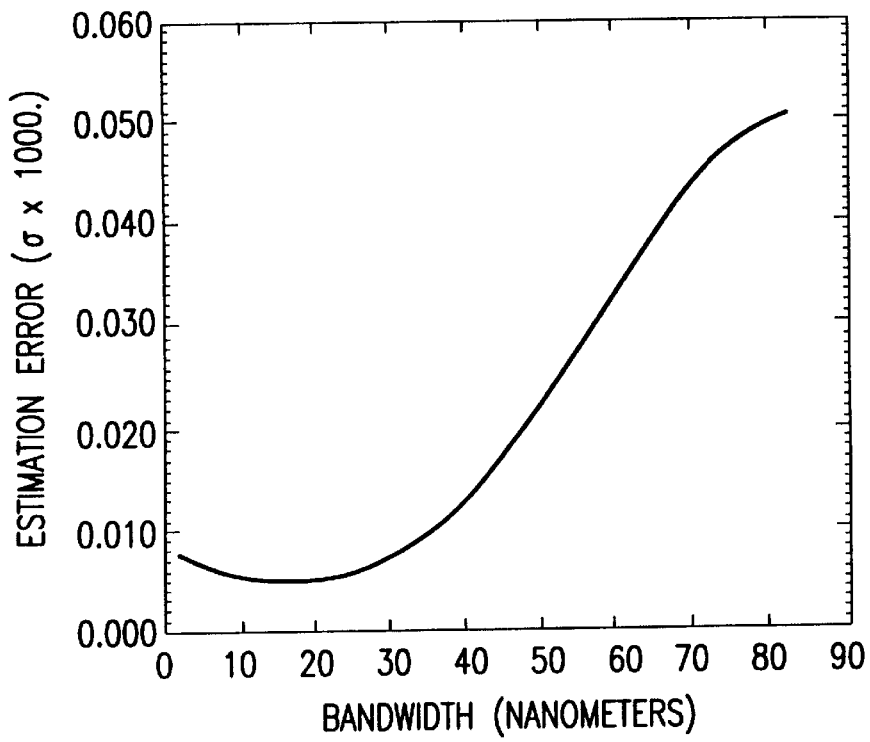
FIG. 4 shows the value of spectral estimation error as a function of bandwidth.

This summation procedure was carried out for all Milton-Roy measurements, thus simulating the data which would have been measured with an instrument with the same source/detector design, but with a spectral bandwidth of 2.0 nm, 7.0 nm, 12.0 nm, 17.0 nm, etc. Dye density estimates using this simulated (larger bandwidth) data were calculated, and the errors in reconstructing the spectra of the measurements using these dye density estimates were calculated (i.e., by taking the square root of the squared error as defined in equation 8, with M including all 23 samples). These errors are plotted in FIG. 4. The Milton-Roy source/detector system has a very flat spectral response and thus the degradation in accuracy is almost completely due to the spectral properties of the photographic dyes.

Figure 5A:
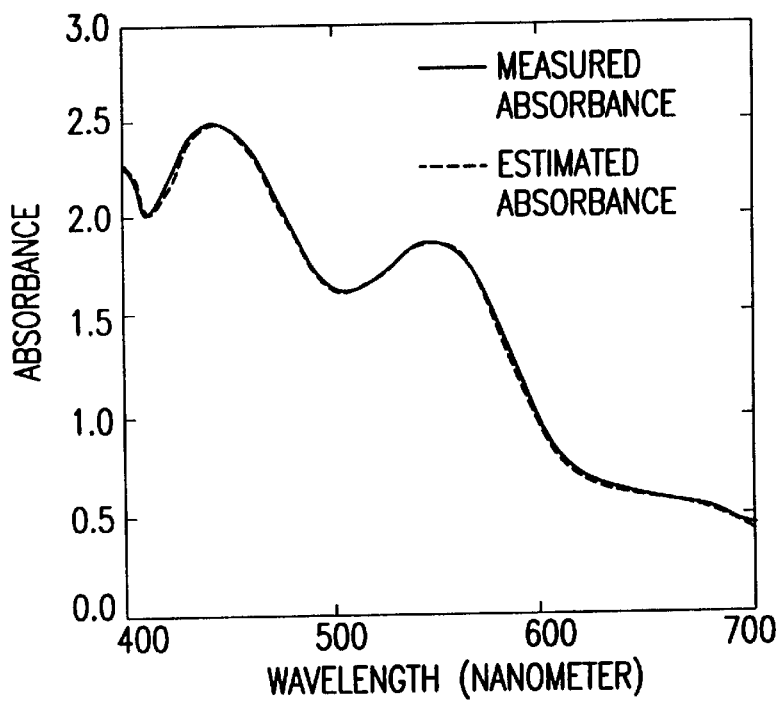
FIG. 5 shows the error in reconstructing a sample of the data set for bandwidths of 2, 32 and 62 nm.
Figure 5B:
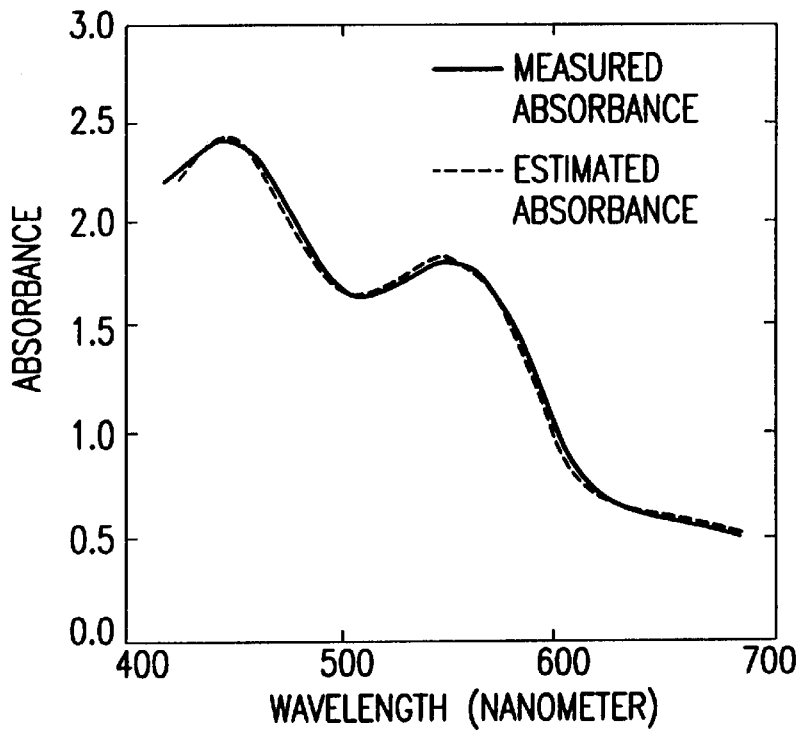
Figure 5C:
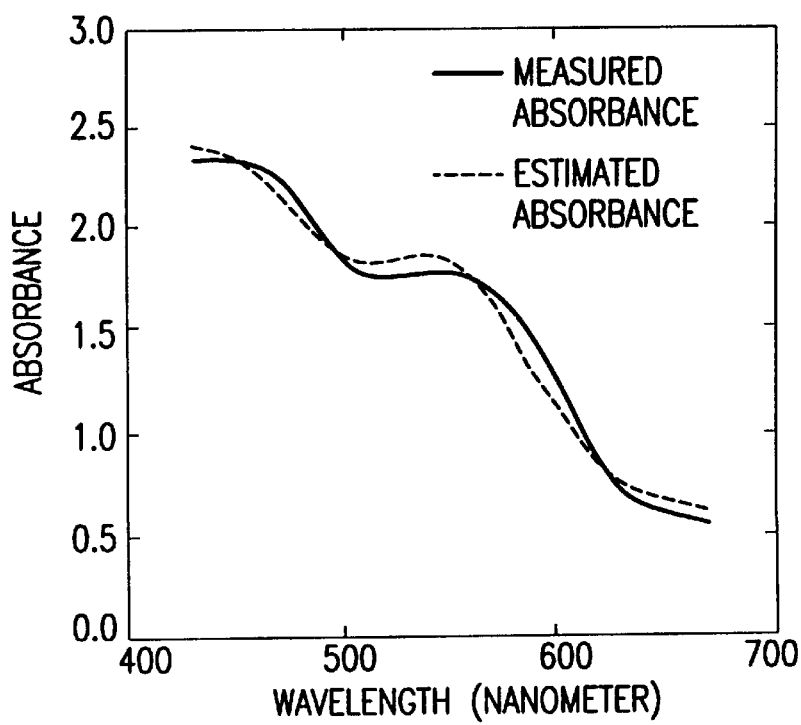

The error increases drastically between bandwidths of 40 to 80 nm. FIG. 5 is an illustration of the inaccuracies due to estimating dye density curves with an overly large bandwidth. The solid lines are plots of the measured analytical densities of sample #19 assuming the measurements were made at various bandwidths. The spectral estimates defined by the dye density curves estimated at the corresponding bandwidth are represented by the dashed lines.

Once a valid set of dye density curve estimates and a valid $d_0'$ are chosen and recorded onto the digital master, the dye concentration values ($c'_m$) must be estimated and recorded for each pixel. If three narrow-band transmission measurements are made for each pixel, then equation 4 can be used to estimate the values. If transmission measurements are taken in more than three bands, then even better estimates are available using least squares estimation:

$$\hat{c}'_m \equiv \text{the estimate of } c'_m = (A'^T A')^{-1} A'^T (z_m - d'_0) \quad \text{Equation (14)}$$

or a weighted least-squares estimation:

$$\hat{c}'_m = (A'^T K_m^{-1} A')^{-1} A'^T K_m^{-1} (z_m - d'_0) \quad \text{Equation (15)}$$

The error in the estimation process is quantifiable for the Milton-Roy data set as a function of the number of filters and the filter bandwidth. For the data used in the present disclosure, the choice of the estimator makes a negligible difference in the results because the Milton-Roy measurements' noise is very low for these samples. However, the noise could be higher for a data set containing samples with very high (i.e., greater than about 2.3) analytical densities.

The product of the source radiation and detector response of the instruments is very flat. Thus, the errors in the estimation of dye concentration which are calculated in this section are only due to the spectral shape of the dye density curves themselves, and these calculated errors can be thought of as best case results. Estimation error will increase if the sample set contains extremely high density samples or if the source or detector response varies significantly within the bandwidth of a measurement. For wide-band estimation, the elements of A are given by band-averaging the dye density curves. For example $y(\lambda_1)$ of equation 4 is replaced by:

$$-\log\left(\frac{\int 10^{-y(\lambda)} f_1(\lambda) s(\lambda) d\lambda}{\int f_1(\lambda) s(\lambda) d\lambda}\right) \quad \text{Equation (16)}$$

where $f_1(\lambda)$ is the filter transmission (a passband filter centered at $\lambda_1$) multiplied by the detector response, and $s(\lambda)$ represents the source.

When calculating this best case error, the dye density curves used are those derived in the previous section, except transformed by the linear combination which optimally fits Kodak's published dye density curves (FIG. 3). This assumes the user has previous knowledge of the film type and is using high resolution dye density curves. The $d_0'$ used is the average of all measured analytical densities, z. Because this differs from the true minimum density curve, the concentration estimates will be offset by a constant from the true dye concentrations (equation 6). In referring to $c_m'$ and $d_0'$, the primes are carried.

To calculate the error of the dye concentration estimates, the spectral positions (i.e., the midpoint of the waveband) of the filter's center wavelengths were optimized. The optimization was accomplished by brute force where every possible combination of filter positions was attempted, and the errors in dye concentration estimation for each position were calculated.

Optimizing the filter positions discloses two trends. First, although the best three filter positions are near the peaks of the dye density curves, there is flexibility in choosing filter positions. So long as the filter positions are near the peaks, moving the filters to a non-optimized position shows little increase in estimation error. Therefore, an accurate instrument for measuring dye concentration can be built without the added complexity of requiring the choice of optimal filter locations. Because dye density peaks are universally near 450 nm, 550 nm, and 650 nm, the best filter locations are expected to be near these wavelengths.

Second, when the filter bandwidths were increased, the optimum positions, after initial movement, became fairly constant as a function of bandwidth. The optimum locations for three narrow filters (2 nm bandwidth) were 465 nm, 570 nm, and 650 nm. As the bandwidth increased, the optimal filter positions steadied at 442 nm, 550 nm and 655 nm. For four narrow filters, the optimal locations were 420 nm, 455 nm, 570 nm, and 650 nm. However as the bandwidth widened, the optimal positions steadied at 445 nm, 550 nm, 647 nm, and 665 nm. At some bandwidths, a 440 nm position replaced the 665 nm position. The optimal positions for five narrow filters were 420 nm, 455 nm, 535 nm, 575 nm, and 650 nm. As the bandwidth increased, the optimal positions steadied at 445 nm, 550 nm, 630 nm, 660 nm, and 680 nm.

The criterion for the optimization is minimizing the standard deviation of the errors in dye concentrations:

$$\sigma = \left(\sum_{m=1}^{M} (\hat{c}'_m - c'_m)^T (\hat{c}'_m - c'_m)\right)^{1/2} \quad \text{Equation (17)}$$

where $\hat{c}_m$ represents the estimate of the dye concentrations for sample m. We consider $c_m$ to be the correct dye concentration value, although it is an estimate using all the data points for each sample (every 5 nm from 400 to 700 nm).

The positions of the filters which minimize σ are a function of the dye density curves used. If a linear combination of the Kodak curves is used, the positions would change. The device contemplated by the present invention could have the positions hard-wired at 450 nm, 550 nm and 650 nm. In such a device, it would be preferable to use dye density curve estimates which peak in these regions. This represents one of the several advantages of using the search procedure described above for finding the dye density estimates, because the search naturally provides estimates with peaks near the 450 nm, 550 nm, and 650 nm positions.

Figure 6:
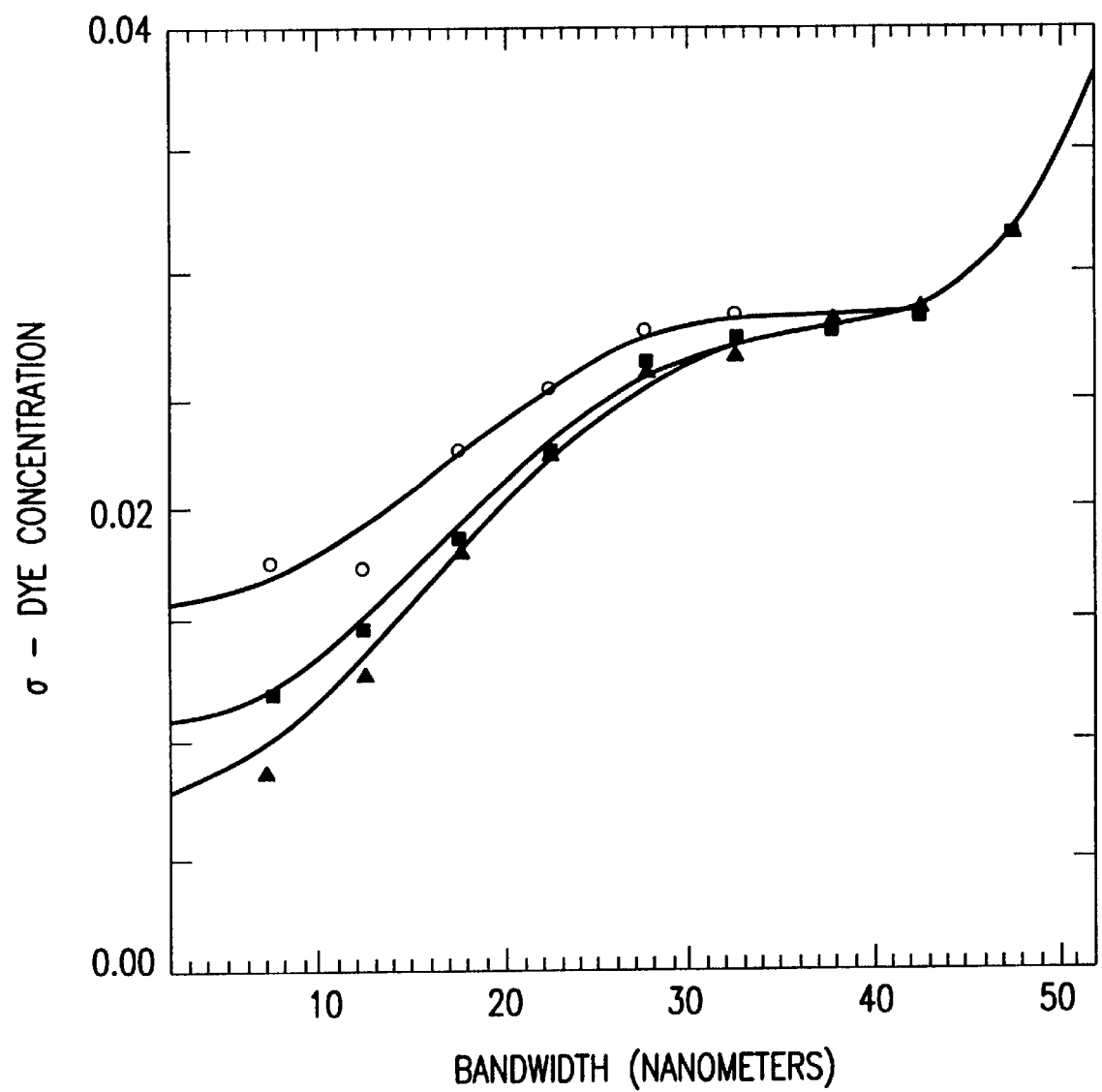
FIG. 6 shows the dye concentration estimation error as a function of bandwidth.

FIG. 6 shows σ as a function of bandwidth for 3, 4, and 5 measurements in the estimation process. As expected, increasing the number of measurements increases performance, until the bandwidth becomes large. When the bandwidth is large, filter positions off the peaks of the dye density curves offer poor information, because these regions have large gradients, and the positions near the peaks provide redundant information, because the peaks themselves are only about 40 nm wide.

Figure 7:
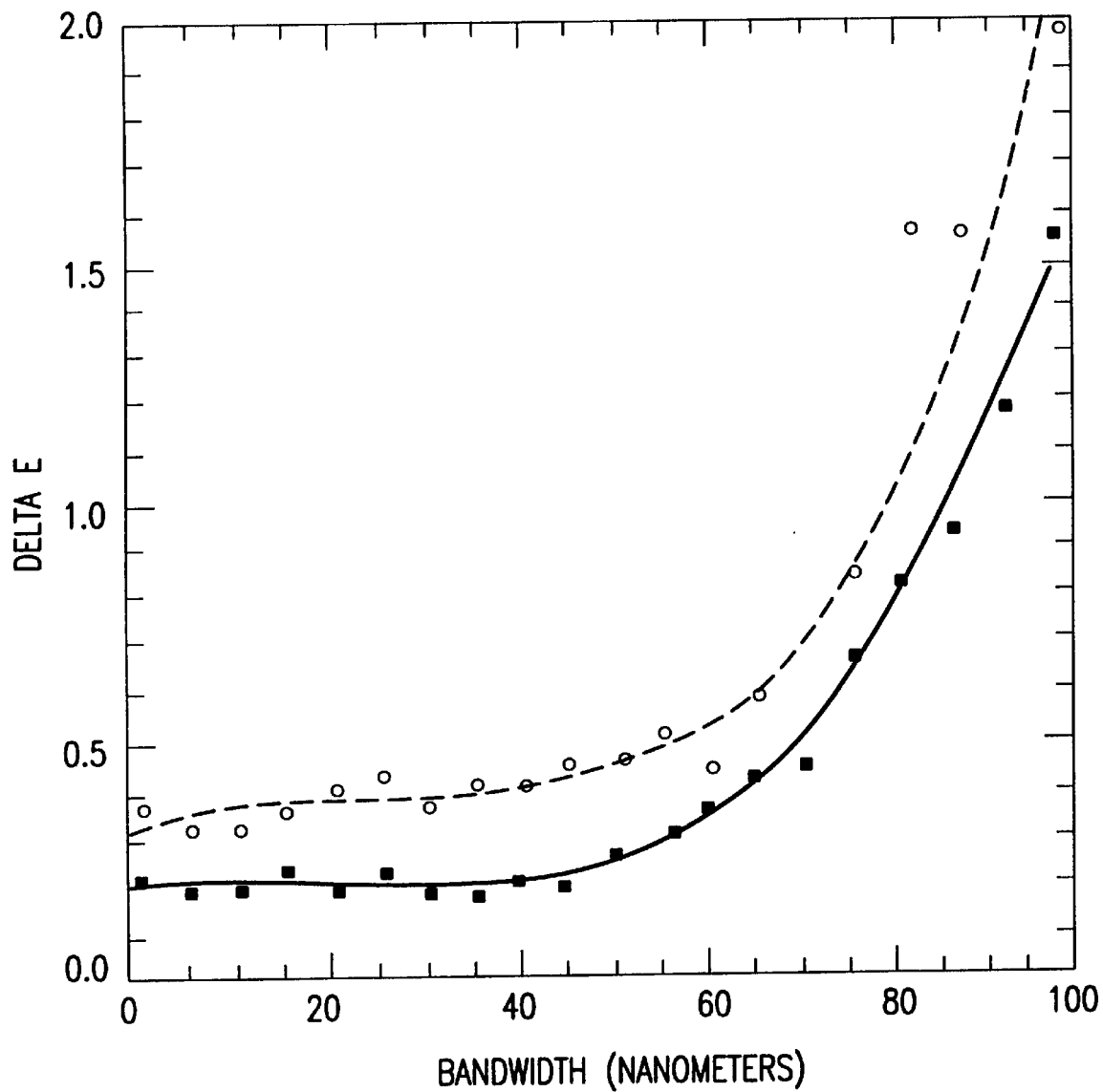
FIG. 7 shows the $\Delta E$ as a function of bandwidth. The top curve includes all samples, and the bottom curves omits the two most highly transmissive samples which contributed the greatest error.

Once the dye concentrations for each pixel are estimated, the full spectral transmission of each pixel can be reconstructed in real time during the playback of the digital master. For reflection points, the reconstructed transmission spectrum must be transformed back to the reflection density at each wavelength (see Equation 17). For the Milton-Roy sample set, the transmissions were reconstructed, and the tristimulus values of these reconstructed spectra were compared to the measured samples. FIG. 7 plots the error in color ($\Delta E$) of the reconstructed spectra as a function of the bandwidth used for dye concentration estimation. The dye concentration estimates were based on three transmission measurements. Because the errors in concentration estimates are low and the sample set is small, there is no decrease in $\Delta E$ as the number of transmission measurements increases from 3 to 5.

The acceptable bandwidth for dye concentration estimation is one of the most important parameters in designing a system which will digitize and record dye concentration amounts. This is because the integration time necessary to achieve a certain signal-to-noise performance is approximately proportional to the square root of the bandwidth. The surprising result here is that bandwidths as high as 50 or 60 nm might be acceptable for such a system.

Present scanners, having bandwidths on the order of 80 nm, operate just beyond the knee of the $\Delta E$ curve, making them unacceptable for measuring dye concentration. An iterative algorithm can be used to remedy this problem by taking scanner readings and, with knowledge of the scanner's response characteristics, estimating dye concentration. See Rodriguez, Michael A., and Stockham, Thomas G., "Producing Colorimetric Data from Densitometric Scans," SPIE Vol. 1913 (1993). Furthermore, a polynomial transformation between scanner output and dye concentrations might be possible. See Berns, R. and Shyu, M., "Colorimetric Characterization of a Desktop Drum Scanner via Image Modeling," IS&T/SID's 2d Color Imaging Conference: Color Science, Systems and Applications (1994). The results displayed in FIG. 7 show that, by careful design, a scanner which measures dye concentration in a direct manner can be built with only a small increase in integration time. Such a scanner is contemplated as within the scope of the present invention. See FIG. 8. One of skill in the art could readily construct the scanner based upon the present disclosure. The general digitization process for a piece of film is diagramed in FIG. 9.

Figure 8:
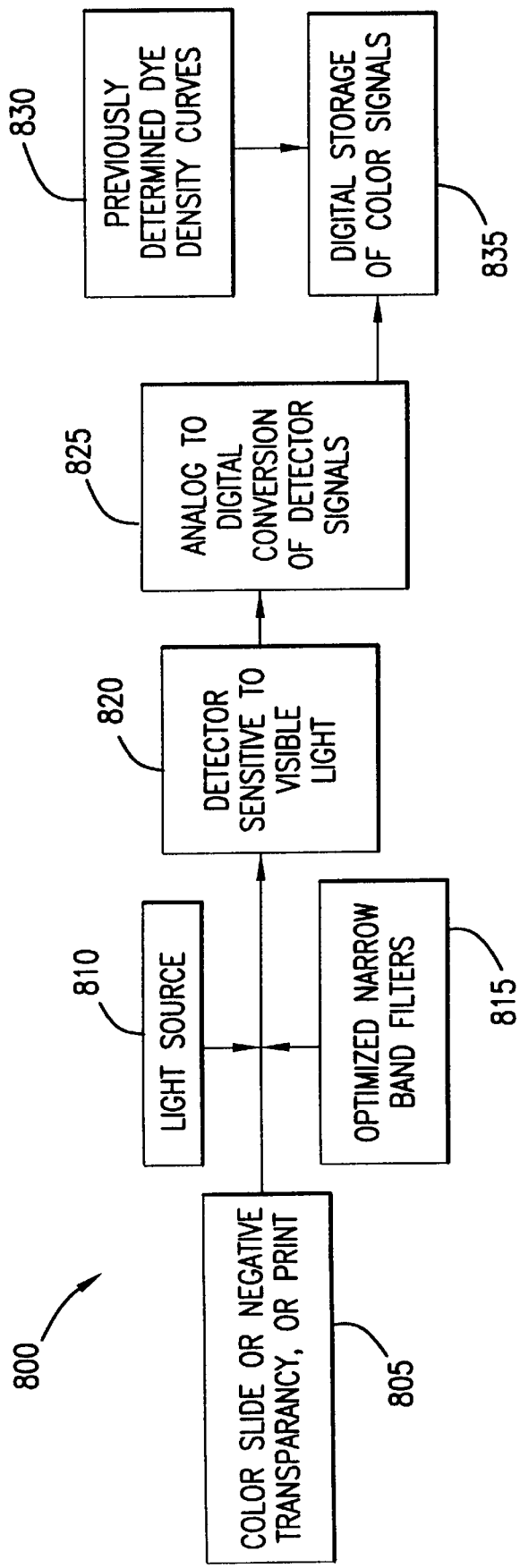
FIG. 8 shows a block diagram of a scanner which embodies the methods and systems of the present invention.

FIG. 8 displays a scanner system 800 according to the present invention. The scanner 800 requires an image source whether color slide, negative transparency or print 805. The scanner 800 utilizes a light source 810, optimized narrow band filters 815 and visible light detectors 820 to measure and generate signals corresponding to transmission or reflectance values as appropriate. The signals pass to an analog to digital converter 825 which passes the data to a digital storage 835 for combination with previously determined dye density curves 830.

Figure 9:
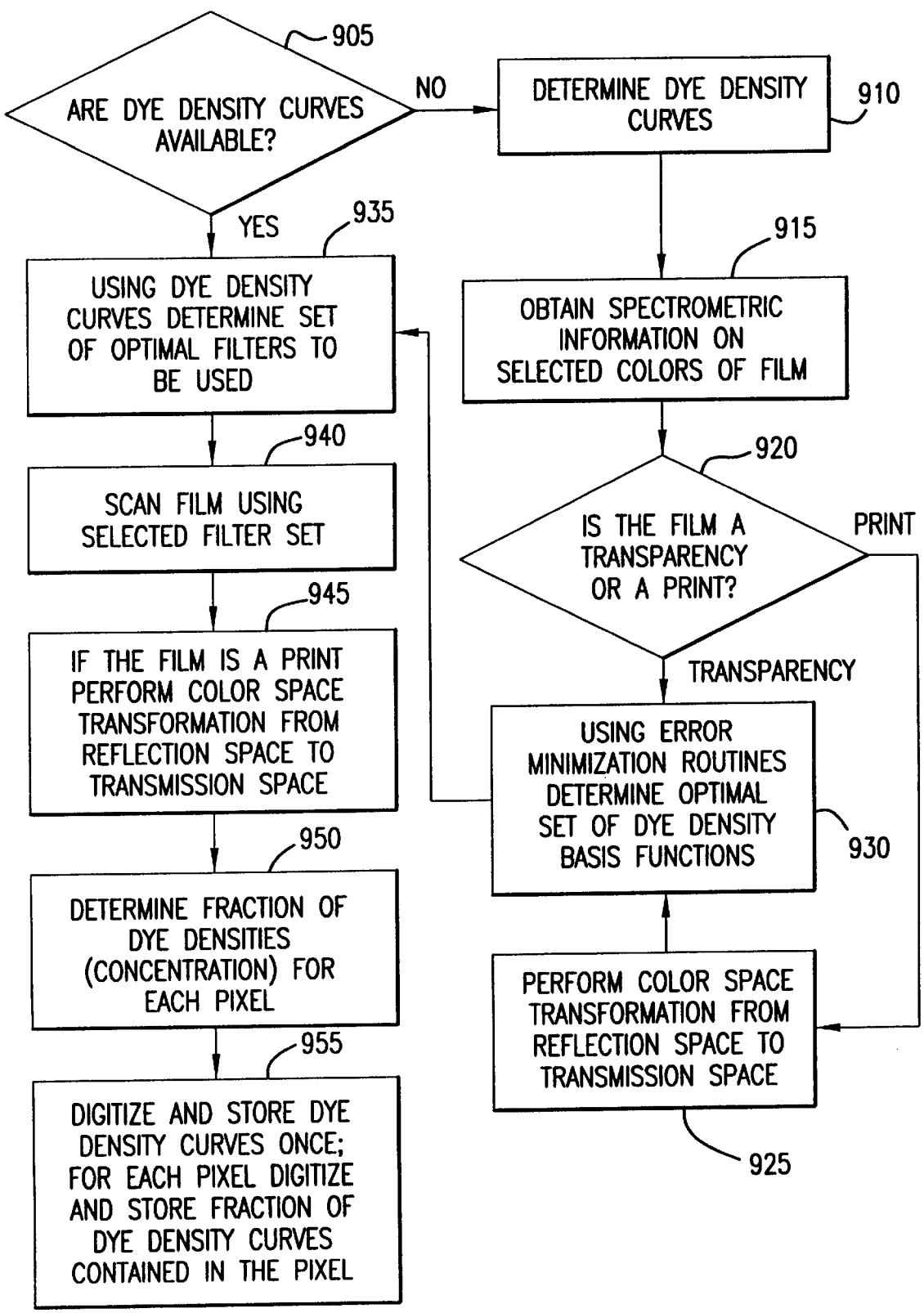
FIG. 9 shows a block diagram of the digitization process of the present invention.

FIG. 9 outlines the steps in the digitization process. In step 905, a determination is made as to whether dye density Curves are available, and if such curves are available, the process continues with step 935. If such curves are unavailable, a determination of such curves is initially made in step 910. In step 915, spectrometric information on selected colors of film is obtained. The process continues with step 930 where an optimal set of dye density basis functions are determined using error minimization routines if the film is determined in step 920 to be a transparency (slide or negative). If the film is determined to be a print in step 920, an additional step 925 is required to transform reflection space measurements to transmission space prior to continuing with step 930. In step 935, the set of optimal filters are determined using the dye density curves, and these filters are used to scan the film in step 940. In step 945, if the film scanned is a print rather than a transparency, the reflection space measurements are transformed to transmission space measurements. For each pixel, the fraction of dye densities is determined in step 950. In step 955, the dye density curve is stored once, and for each pixel, the fraction of dye density curves contained in the pixel is stored.

For photographic reflection prints, one additional step must be addressed in order to build a suitable scanning system. The system must perform a transformation between reflection measurements and the equivalent transmission of the light source through the dye layers in the film. By modeling the transmission and scattering of light through a reflection print, one arrives at a suitable mathematical transformation function (Equation 17):

$$R = -\log\left[\frac{T0 \cdot T45 \cdot 10^{-\left(1+\frac{1}{\cos\theta}\right)d} \cdot Refl \cdot BRDF1}{rn^2 \cdot \left[1 - 2Refl \cdot \left(BRDF2 \int_0^{\theta_c} Fr \cdot 10^{-2\frac{d}{\cos x}}\cos x \cdot \sin x \cdot dx + \frac{1 - BRDF1 \cdot \sin^2\theta_c}{1 - \sin^2\theta_c} \cdot \int_{\theta_c}^{\pi/2} 10^{-2\frac{d}{\cos x}}\cos x \cdot \sin x \cdot dx\right)\right]}\right]$$

Equation (17)

where d is the transmission value and R is the reflection value. In this equation, T0 is the transmission of the source light into the dye layers (usually, but not necessarily, at zero degrees illumination), T45 is the transmission of the reflected light out of the dye layer (usually, but not necessarily, at 45 degrees for measurement purposes), rn is the index of refraction of the dye layer, $\theta_c$ is the critical angle of the dye layer, $\theta$ is the angle that the illuminated light makes with the vertical inside the dye layer, Fr is the Fresnel reflection factor for the angle x, Refl is the bulk paper reflection, BRDF1 and BRDF2 are directional reflection factors which model the fact that the paper favors backscattering over scattering into grazing angles for typical source illumination angles, and BS is a back-scatter parameter which quantifies spurious scattering off the surface or off dye particles.

In using such a transformation, it is often more useful to approximate the actual relationship between reflection densities and transmission densities with a polynomial or look-up table, so that this complicated relation need not be calculated for each measurement.

Another preferred use of the present invention is in a system for restoring faded film. Dark fading of cyan dye via reductive reactions causes some of the dye to become colorless over time. Bard, Charleston C., et al., "Predicting Long-Term Dark Storage Dye Stability Characteristic of Color Photographic Products from Short-Term Tests," Journal of Applied Photographic Engineering, vol. 6, number 2 (1980). A restored value of the cyan dye concentration can be stored on the master by boosting dye concentration estimate at each pixel. To do this, the dye concentration estimation must use the actual manufacturer's dye density curves. Otherwise, the restored dye amounts can still be stored to the digital master, but this requires balancing of all three dye concentrations. Such balancing requires an estimation of the degree to which the dye has faded. However, if the faded film is digitized in the XYZ or RGB color system, there is no global linear transformation which could correctly restore the film's color.

Fading can cause problems for the film digitization technique outlined in this application. First, if the fading occurs inhomogenously, then dye density curve estimates will only be valid in local areas. One remedy is to use more than three spectral transmission measurements to estimate the dye concentrations. If this error exceeds a threshold value, one can re-estimate the dye density curves.

Secondly, if dye fading creates products which are not clear and which have different spectral properties than the dye itself, then the fading necessitates the use of more than three dye density curves. This requires more spectral transmission measurements per pixel to separate out the three dye components from the components due to the faded products. This can only be accomplished if the original dye density curves are known. However, if the faded product estimation is accomplished, the concentration of the faded products can be used to estimate how much of a boost the three dye concentrations need for restoration.

Thus, fading is a threat to accurate dye concentration estimation. However, the information derived from the measurements of faded films can be used to restore those films, or at least warn the user when the digitization formalism is adversely affected by the fading.

Digitization of film via the measurement of dye concentration has obvious advantages in terms of its device independence, its characterization of the full spectral content of the film and in the ability to restore faded films. This digitization process occurs in two steps: First, estimation of dye density and minimum density curves (to within an arbitrary combination of the dye density curves). This step is unnecessary if the film type is known and the dye's analytical densities are available. Second, estimation of dye concentration for each pixel of the frame of the film.

The maximum likelihood approach to density curve estimation was suggested because that approach showed that, based on information about the measurement noise, one can use spectral measurements of selected areas of the film to estimate dye density curves. If the estimates are found via a search routine starting from an intelligent initial guess, then the resulting estimates will be fairly close to the actual dye density curves. The error of this estimation as a function of bandwidth increases significantly for bandwidths greater than 30 nm.

Furthermore, a weighted least-squares estimation approach was also suggested to estimate the dye concentration for each pixel. The error in this estimation, as a function of bandwidth and number of spectral transmission measurements used to accomplish the estimation, was low for bandwidths as high as 60 nm when accurate estimates of the dye density curves were available.

Because dye density curve estimation must generally only be accomplished at most once for any particular film, and dye concentration estimation must occur for each pixel, speed is important only in the latter estimation. Therefore, the availability of large bandwidths is convenient for optimizing speed in the later estimation.

Based upon the above, the present invention discloses a further method of digitizing an image whereby the dye concentrations are recorded for each pixel and the dye density curves are known or calculated for the film. This method has significant advantages over conventional RGB color schemes because a single global transformation can be applied to the information to restore faded values or otherwise provide an accurate transformation.

The presently described invention also extends to any devices and processes where a spectrum is collected and the spectrum can be considered to be the sum of basis functions (e.g., gamma radiation spectra can be the sum of many different gamma emitters). One could use the procedure to collapse the spectrum into its basis function components for further analysis and/or more compact digital storage.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method for digitizing a film frame having one or more dye layers, wherein the one or more dye layers of the film frame comprise a cyan dye layer, a magenta dye layer, and a yellow dye layer, wherein the film has a known analytical density of each layer and a known minimum density of each layer, comprising the steps of:

a) generating analytical density signals corresponding to the known analytical densities of the film and generating minimum density signals corresponding to the known minimum densities of the film;

b) dividing the film frame into one or more pixels;

c) for each pixel, measuring transmittance values in frequency bands associated with each of dye layers, wherein the frequency bands associated with each of dye layers consist of at least four frequency bands, and generating transmittance signals corresponding to the measured transmittance values;

d) generating a plurality of dye concentration signals by least-squares or weighted least squares estimation for each pixel from
        i) the transmittance signals corresponding to the measured transmittance values;
        ii) the analytical density signals corresponding to the known analytical densities of the film; and
        iii) the minimum density signals corresponding to the known minimum densities of the film; and e) outputting the dye concentration signals for each pixel to a signal processing device.

2. The method of claim 1, wherein the measuring step comprises:

a) irradiating the film with a light source having a selected intensity;

b) in each of the frequency bands associated with each of dye layers, detecting the radiation transmitted through the film; and c) in each of the frequency bands associated with each of dye layers, dividing the radiation transmitted through the film by the selected intensity of the light source to determine the measured transmittance value.

3. The method of claim 1, wherein each of the frequency bands associated with each of dye layers is a narrow frequency band.

4. The method of claim 1, wherein each of the frequency bands associated with each of dye layers spans less than about 100 nm.

5. The method of claim 1, wherein each of the frequency bands associated with each of dye layers spans less than about 60 nm.

6. The method of claim 1, wherein each of the frequency bands associated with each of dye layers spans less than about 40 nm.

7. The method of claim 1, wherein each of the frequency bands associated with each of dye layers spans about 2 nm.

8. The method of claim 1, wherein the signal processing device is a means for storing and retrieving one or more signals.

9. The method of claim 1, wherein the signal processing device is a means for, for each of the pixels in the film frame, generating a signal corresponding to a projected pixel color from the plurality of dye concentration signals, the method further comprising the step of outputting the projected pixel color signals to a second signal processing device.

10. A method for digitizing a film frame having one or more dye layers, wherein the film has an analytical density of each layer and a minimum density of each layer, comprising the steps of:
   a) for each dye layer, estimating a candidate linear combination of the selected analytical densities of the film and the minimum densities of the film, wherein the estimating step comprises:
      i) measuring the analytical density z of a full spectral measurement of a selected number of pixels M of the film frame and generating signals corresponding to the measured analytical densities z; ii) generating signals corresponding to the estimated analytical density and estimated the minimum density in the film from the spectral measurement of the M pixels by minimizing:

$$\frac{1}{NM}\sum_{m=1}^{M}(z_m - \hat{d}_0' - \hat{A}'\hat{c}'_m)^T(z_m - \hat{d}_0' - \hat{A}'\hat{c}'_m)$$

wherein $z_m$ is the measured analytical density of pixel m;
   N is the number of wavelengths used for the spectral measurement; and
   A', $d_0'$, and ĉ' are, respectively, the estimates of the estimated analytical densities, the estimated minimum densities and the estimated dye concentration signals;
   b) generating analytical density signals corresponding to the analytical densities of the film and generating density signals corresponding to the minimum densities of the film;
   c) dividing the film frame into one or more pixels;
   d) for each pixel, measuring transmittance values in frequency bands associated with each of dye layers and generating transmittance signals corresponding to the measured transmittance values;
   e) generating a plurality of dye concentration signals for each pixel from
      i) the transmittance signals corresponding to the measured transmittance values;
      ii) the analytical density signals corresponding to the analytical densities of film; and
      iii) the minimum density signals corresponding to the minimum densities of the film; and
   f) outputting the dye concentration signals for each pixel to a signal processing device.

11. The method of claim 10, wherein the signal processing device is a means for storing and retrieving one or more signals and further comprising the steps, in a selected order, of:
   a) outputting the analytical density signals corresponding to the analytical densities of the film to the means for storing and retrieving one or more signals;
   b) outputting the minimum density signals corresponding to the minimum densities of the film to the means for storing and retrieving one or more signals; and
   c) outputting the dye concentration signals for each pixel to the means for storing and retrieving one or more signals.

12. A method for digitizing a film frame having one or more dye layers, wherein the film has an analytical density of each layer and a minimum density of each layer, comprising the steps of:
   a) for each dye layer, estimating a candidate linear combination of the selected analytical densities of the film and the minimum densities of the film, wherein the estimating step comprises:
      i) measuring the analytical density z of a full spectral measurement of a selected number of pixels M of the film frame and generating signals corresponding to the measured analytical densities z;
      ii) generating signals corresponding to the estimated analytical density and estimated the minimum density in the film from the spectral measurement of the M pixels by maximizing:

$$pdf = \prod_{m=1}^{M}\frac{1}{(2\pi)^{N/2}|K_m|}\exp\left\{-\frac{1}{2}[(z_m - d_0' - A'c'_m)^T K_m^{-1}(z_m - d_0' - A'c'_m)]\right\}$$

wherein $z_m$ is the measured analytical density of pixel m;
   N is the number of wavelengths used for the spectral measurement;
   $K_m$ is the N-by-N measurement noise covariance matrix for pixel m; and
   A', $d_0'$, and ĉ' are, respectively, the estimates of the estimated analytical densities, the estimated minimum densities and the estimated dye concentration signals;
   b) generating analytical density signals corresponding to the analytical densities of the film and generating density signals corresponding to the minimum densities of the film;
   c) dividing the film frame into one or more pixels;
   d) for each pixel, measuring transmittance values in frequency bands associated with each of dye layers and generating transmittance signals corresponding to the measured transmittance values;
   e) generating a plurality of dye concentration signals for each pixel from
      i) the transmittance signals corresponding to the measured transmittance values;
      ii) the analytical density signals corresponding to the analytical densities of film; and iii) the minimum density signals corresponding to the minimum densities of the film; and f) outputting the dye concentration signals for each pixel to a signal processing device.

13. A method for digitizing a film frame having one or more dye layers, wherein the film has an analytical density of each layer and a minimum density of each layer, comprising the steps of:

a) for each dye layer, estimating a candidate linear combination of the selected analytical densities of the film and the minimum densities of the film, wherein the estimating step comprises:

i) measuring the analytical density z of a full spectral measurement of a selected number of pixels M of the film frame and generating signals corresponding to the measured analytical density;

ii) generating a signal corresponding to the estimated analytical densities and estimated the minimum densities in the film from the spectral measurement of the M pixels by minimizing:

$$\chi^2 \equiv \sum_{m=1}^{M} (z_m - d_0' - A'c'_m)^T K_m^{-1} (z_m - d_0' - A'c'_m)$$

wherein $z_m$ is the measured analytical density of pixel m;
     $K_m$ is the N-by-N measurement noise covariance matrix for pixel m; and
     A', $d_0'$, and $\hat{c}'$ are, respectively, the estimates of the estimated analytical densities, the estimated minimum densities and the estimated dye concentration signals;

b) generating analytical density signals corresponding to the analytical densities of the film and generating density signals corresponding to the minimum densities of the film;

c) dividing the film frame into one or more pixels;

d) for each pixel, measuring transmittance values in frequency bands associated with each of dye layers and generating transmittance signals corresponding to the measured transmittance values;

e) generating a plurality of dye concentration signals for each pixel from
     i) the transmittance signals corresponding to the measured transmittance values;
     ii) the analytical density signals corresponding to the analytical densities of film; and
     iii) the minimum density signals corresponding to the minimum densities of the film; and outputting the dye concentration signals for each pixel to a signal processing device.

14. A method for digitizing a reflective print frame having one or more dye layers, wherein the print frame has a known analytical density of each layer and a known minimum density of each layer, comprising the steps of:

a) generating analytical density signals corresponding to the known analytical densities of the print frame and generating minimum density signals corresponding to the known minimum densities of the print frame;

b) dividing the print frame into one or more pixels;

c) for each pixel, measuring reflectance values in frequency bands associated with each of dye layers and generating reflectance signals corresponding to the measured reflectance values;

d) generating a plurality of dye concentration signals for each pixel from
     i) the reflectance signals corresponding to the measured reflectance values;
     ii) the analytical density signals corresponding to the known analytical densities of the print frame; and
     iii) the minimum density signals corresponding to the known minimum densities of the print frame; and e) outputting the dye concentration signals for each pixel to a signal processing device.

15. The method of claim 14, wherein the measuring step comprises:

a) irradiating the print frame with a light source having a selected intensity;

b) in each of the frequency bands associated with each of dye layers, detecting the radiation reflected from the print frame;

c) in each of the frequency bands associated with each of dye layers, dividing the radiation reflected from the print frame by the selected intensity of the light source to determine the measured reflectance values; and d) computing transmittance values from each of the reflectance values.

16. The method of claim 14, wherein the one or more dye layers of the print frame comprise a cyan dye layer, a magenta dye layer, and a yellow dye layer.

17. The method of claim 16, wherein the frequency bands associated with each of dye layers consist of three frequency bands and wherein the step of generating a plurality of dye concentration signals comprises estimating a solution for $d_c$, $d_m$, and $d_y$ in equation I:

$$\begin{bmatrix} -\log[\tau(\lambda_1)] \\ -\log[\tau(\lambda_2)] \\ -\log[\tau(\lambda_3)] \end{bmatrix} = \begin{bmatrix} c(\lambda_1) & m(\lambda_1) & y(\lambda_1) \\ c(\lambda_2) & m(\lambda_2) & y(\lambda_2) \\ c(\lambda_3) & m(\lambda_3) & y(\lambda_3) \end{bmatrix} \begin{bmatrix} d_c \\ d_m \\ d_y \end{bmatrix} + \begin{bmatrix} d_0(\lambda_1) \\ d_0(\lambda_2) \\ d_0(\lambda_3) \end{bmatrix}$$

wherein
   $d_c$, $d_m$, and $d_y$ are the estimated dye concentration values;
   $\lambda_1$ through $\lambda_3$ are the three frequency bands;
   $\tau(\lambda_1)$ through $\tau(\lambda_3)$ are the transmittance values of the print frame in frequency bands $\lambda_1$ through $\lambda_3$;
   $c(\lambda_1)$ through $c(\lambda_3)$, $m(\lambda_1)$ through $m(\lambda_3)$, and $y(\lambda_1)$ through $y(\lambda_3)$ are, respectively, the dye densities of the print frame in the cyan dye layer, the magenta dye later and the yellow dye layer in frequency bands $\lambda_1$ through $\lambda_3$; and $d_0(\lambda_1)$ through $d_0(\lambda_3)$ are the minimum absorption density values of the print frame in frequency bands $\lambda_1$ through $\lambda_3$;
and generating signals corresponding to the estimated dye concentration values.

18. The method of claim 16, wherein the frequency bands associated with each of dye layers consist of at least four frequency bands and wherein the step of generating a plurality of dye concentration signals comprises determining the plurality of dye concentration signals by least-squares or weighted least squares estimation.

19. The method of claim 14, wherein each of the frequency bands associated with each of dye layers is a narrow frequency band.

20. The method of claim 14, wherein each of the frequency bands associated with each of dye layers spans less than about 100 nm.

21. The method of claim 14, wherein the signal processing device is a means for storing and retrieving one or more signals.

22. The method of claim 14, wherein each of the frequency bands associated with each of dye layers spans less than about 60 nm.

23. The method of claim 14, wherein each of the frequency bands associated with each of dye layers spans less than about 40 nm.

24. The method of claim 14, wherein each of the frequency bands associated with each of dye layers spans about 2 nm.

25. A method for digitizing a reflective print frame having one or more dye layers, wherein the print frame has an analytical density of each layer and a minimum density of each layer, comprising the steps of:

a) for each dye layer, estimating a candidate linear combination of the selected analytical densities of the print frame and the minimum densities of the print frame;

b) generating analytical density signals corresponding to the analytical densities of the print frame and generating density signals corresponding to the minimum densities of the print frame;

c) dividing the print frame into one or more pixels;

d) for each pixel, measuring reflectance values in frequency bands associated with each of dye layers and generating reflectance signals corresponding to the measured reflectance values;

e) generating a plurality of dye concentration signals for each pixel from i) the reflectance signals corresponding to the measured reflectance values;

ii) the analytical density signals corresponding to the analytical densities of print frame; and iii) the minimum density signals corresponding to the minimum densities of the print frame; and f) outputting the dye concentration signals for each pixel to a signal processing device.

* * * * *